(12) United States Patent
Nitta et al.

(10) Patent No.: US 7,200,810 B2
(45) Date of Patent: Apr. 3, 2007

(54) DIGITAL CONTENT PRODUCTION SYSTEM AND DIGITAL CONTENT PRODUCTION PROGRAM

(75) Inventors: Takashi Nitta, Chino (JP); Hirotaka Ohashi, Chino (JP)

(73) Assignee: Seiko Epson Corporation, Tokyo (JP)

( * ) Notice: Subject to any disclaimer, the term of this patent is extended or adjusted under 35 U.S.C. 154(b) by 535 days.

(21) Appl. No.: 10/109,636

(22) Filed: Apr. 1, 2002

(65) Prior Publication Data
US 2002/0140982 A1 Oct. 3, 2002

(30) Foreign Application Priority Data
Mar. 30, 2001 (JP) ............................. 2001-101306

(51) Int. Cl.
*G06N 3/00* (2006.01)
(52) U.S. Cl. ....................................... 715/517
(58) Field of Classification Search ................ 715/513, 715/517, 523, 530
See application file for complete search history.

(56) References Cited

U.S. PATENT DOCUMENTS

| | | | | |
|---|---|---|---|---|
| 5,065,358 A | * | 11/1991 | Yamakawa ............... | 715/531 |
| 5,438,512 A | * | 8/1995 | Mantha et al. ........... | 715/517 |
| 5,742,837 A | * | 4/1998 | Fukui et al. ............ | 715/517 |
| 5,845,303 A | * | 12/1998 | Templeman ............. | 715/517 |
| 5,895,476 A | * | 4/1999 | Orr et al. ............... | 715/517 |
| 5,956,737 A | * | 9/1999 | King et al. .............. | 715/517 |
| 6,061,700 A | * | 5/2000 | Brobst et al. ............ | 715/517 |
| 6,332,150 B1 | * | 12/2001 | Khan et al. ............. | 715/526 |
| 6,366,996 B1 | * | 4/2002 | Hobson et al. .......... | 711/206 |
| 6,519,617 B1 | * | 2/2003 | Wanderski et al. ...... | 715/513 |
| 6,546,397 B1 | * | 4/2003 | Rempell ................. | 707/102 |
| 6,718,515 B1 | * | 4/2004 | Conner et al. .......... | 715/509 |
| 6,725,423 B1 | * | 4/2004 | Muramoto et al. ...... | 715/513 |
| 6,748,569 B1 | * | 6/2004 | Brooke et al. .......... | 715/523 |
| 6,760,638 B1 | * | 7/2004 | Love et al. ............. | 700/98 |
| 6,766,495 B1 | * | 7/2004 | Bates et al. ............ | 715/531 |
| 2001/0014900 A1 | * | 8/2001 | Brauer et al. .......... | 707/513 |

(Continued)

FOREIGN PATENT DOCUMENTS

JP A 58-144255 8/1983

(Continued)

OTHER PUBLICATIONS

"Microsoft(r) Office 2000 Scrrenshots," 1999, Figures 1-6.*

*Primary Examiner*—Stephen Hong
*Assistant Examiner*—Kyle R. Stork
(74) *Attorney, Agent, or Firm*—Oliff & Berridge, PLC

(57) ABSTRACT

The present invention provides a digital content production system and a digital content production program, which are appropriate for use in preventing a layout intended by a designer from being destroyed. The invention keeps the consistency of the layout, and prevents the order of posting information from being disturbed by the generation of overflow of information. A content delivery terminal produces a digital content for output by storing information to be posted into a plurality of information storage frames while referencing a layout definition file. When a text information storage frame is not sufficient to store text information, a flow object of the text information that cannot be stored in the text information storage frame can be stored into another text information storage frame having the same ID as that of the text information storage frame.

10 Claims, 15 Drawing Sheets

400 FLOW MANAGEMENT TABLE

| 402 | 404 | 406 | 408 | 410 | 412 |
|---|---|---|---|---|---|
| DOCUMENT NO. | OVERFLOW POSITION | ID OF TEXT INFORMATION STORAGE FRAME | PAGE NO. OF OVERFLOW SOURCE | STORAGE PAGE NO. OF FLOW OBJECT | FINISH FLAG |
| | | | | | |
| | | | | | |
| | | | | | |
| | | | | | |

U.S. PATENT DOCUMENTS

| | | | |
|---|---|---|---|
| 2001/0047384 A1* | 11/2001 | Croy | 709/203 |
| 2002/0103829 A1* | 8/2002 | Manning et al. | 707/513 |
| 2002/0107894 A1* | 8/2002 | Kent et al. | 707/517 |
| 2002/0116418 A1* | 8/2002 | Lachhwani et al. | 707/517 |
| 2002/0124023 A1* | 9/2002 | Wormley | 707/517 |
| 2002/0143820 A1* | 10/2002 | Van Eaton et al. | 707/517 |
| 2002/0161802 A1* | 10/2002 | Gabrick et al. | 707/517 |
| 2003/0037076 A1* | 2/2003 | Bravery et al. | 707/517 |

FOREIGN PATENT DOCUMENTS

| | | |
|---|---|---|
| JP | A 64-51563 | 2/1989 |
| JP | A 2-3863 | 1/1990 |
| JP | A 4-148272 | 5/1992 |
| JP | A 7-114557 | 5/1995 |

* cited by examiner

| USER ID | DESTINATION ADDRESS | CATEGORY NO. | KEYWORD | DATE OF DELIVERY | TIME OF DELIVERY | LAYOUT NO. | MAXIMUM NO. OF PAGES | FONT SIZE |
|---|---|---|---|---|---|---|---|---|
| Andy | Andy@aaa.com | 1700 | PROCESSOR | EVERYDAY | 5 | 2 | 2 | SMALL |
| Bill | Bill@bbb.com | 1501 | OS | WEEKDAY | 11 | 5 | 2 | SMALL |
| Candy | Candy@ccc.com | 201* | APPLICATION | WEEKEND | 9 | 6 | u | STANDARD |

300 USER PROFILE TABLE

330 LAYOUT NUMBER DEFINITION TABLE

| LAYOUT NO. | LAYOUT DEFINITION FILE NAME |
|---|---|
| 1 | form 01 |
| 2 | form 02 |
| 3 | form 03 |
| 4 | form 04 |
| 5 | form 05 |
| 6 | form 06 |

400 FLOW MANAGEMENT TABLE

| DOCUMENT NO. | OVERFLOW POSITION | ID OF TEXT INFORMATION STORAGE FRAME | PAGE NO. OF OVERFLOW SOURCE | STORAGE PAGE NO. OF FLOW OBJECT | FINISH FLAG |
|---|---|---|---|---|---|
| | | | | | |
| | | | | | |
| | | | | | |
| | | | | | |

(a)

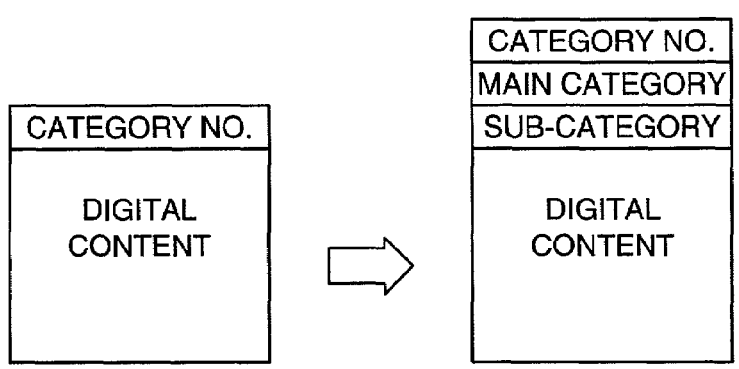

(b)

340 CATEGORY NUMBER DEFINITION TABLE

| CATEGORY NO. | MAIN CATEGORY | SUB-CATEGORY |
|---|---|---|
| 1102 | WORLD NEWS | U.S. |
| 1135 | LOCAL NEWS | TOKYO |
| 1122 | POLITICS | ELECTION |
| 1202 | WEATHER | WORLD TEMPERATURES |
| 1310 | BUSINESS | FINANCIAL AFFAIRS |
| 2010 | SPORTS | BASEBALL |
| 2020 | SPORTS | FOOTBALL |
| 2030 | SPORTS | BASKETBALL |
| 2040 | SPORTS | HOCKEY |
| 2050 | SPORTS | SOCCER |
| 2070 | SPORTS | GOLF |
| 3000 | SPORTS | TENNIS |
| 1121 | HOBBIES | HISTORY |
| 1500 | HEALTH | PREVENTIONS |
| 1401 | ENTERTAINMENTS | TELEVISION |
| 1432 | TRAVEL | TOURISM |
| 1501 | SCIENCE AND TECHNOLOGY | COMPUTER |

(a)
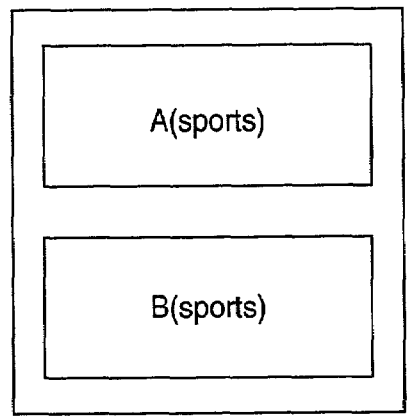
PAGE X
(b)
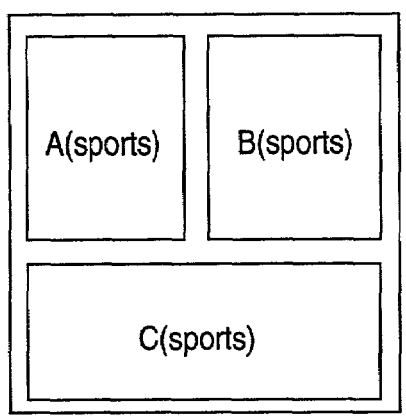 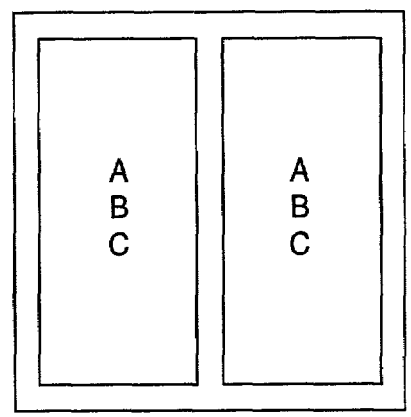
PAGE X        PAGE Y
FIG. 18

DIGITAL CONTENT PRODUCTION SYSTEM AND DIGITAL CONTENT PRODUCTION PROGRAM

BACKGROUND OF THE INVENTION

1. Field of Invention

The present invention relates to digital content production systems and digital content production programs applied to the digital content production systems. More particularly, the present invention relates to a digital content production system and a digital content production program, which is appropriate for use in preventing a layout intended by a designer from being destroyed, keeps the consistency of the layout, and prevents the order of posting information from being disturbed by an overflow of information.

2. Description of Related Art

Currently, digital content delivery systems for providing users with digital contents, such as news, have been available. In such a digital content delivery system, several digital contents are read from a content registration data base (hereinafter the data base is simply referred to as DB), the read digital content is edited, and the edited digital content is then delivered to a user. In the editing process of the digital content, the digital content is edited in an easy-to-see layout to users. For example, techniques available to perform the layout can include a document organizing apparatus disclosed in Japanese Unexamined Patent Application Publication No. 1-180062 (hereinafter referred to as a first conventional art), and a document arranging apparatus disclosed in Japanese Unexamined Patent Application Publication No. 9-69096 (hereinafter referred to as a second conventional art).

The first conventional art includes a document storage unit for storing document data, a form storage unit for storing form data in accordance with the field of a document, a parser unit for parsing the logical structure of the document data in accordance with a document structure rule, a form selection unit for selecting form data appropriate for the document data, from among the form data in the form storage unit based on the logical structure parsed by the parser unit, and an organizing unit for organizing the document data in accordance with the logical structure and the form data selected by the form selection unit.

In the second conventional art, each of a plurality of types of column structures has several rectangular shapes into which space of a page is segmented using randomly arranged vertical and horizontal lines. A layout device searches for a single column or a composite column including a plurality of linked adjacent columns, appropriate for each document, in accordance with a random document processing order. Several layouts are obtained, in which a plurality of documents are organized in a plurality of column settings. A layout result assessment device can set an assessment score to each layout result based on a document posting priority order of each document. A best arrangement result search device can select the layout result having the highest score. A printing device can print a document in which a plurality of documents is organized in the column setting in accordance with the best layout result.

In available techniques to lay out the digital content, such as the first conventional art or the second conventional art, typically, a plurality of information storage frames for storing information to be posted (information such as an image or a document) forming a digital content is arranged in a layout area and the information to be posted is stored in these information storage frames. In the layout process, the information storage frame may not be sufficient to fully store the information with a portion thereof overflowed, depending on the amount of the information to be posted. For example, techniques available to prevent overflowing are a document automatic layout apparatus disclosed in Japanese Unexamined Patent Application Publication No. 4-60758 (hereinafter referred to as a third conventional art) and a document processing apparatus disclosed in Japanese Unexamined Patent Application Publication No. 3-70068 (hereinafter referred to as a fourth conventional art).

The third conventional art modifies the font size of characters and the pitch of documents and the pitch of lines on a document if the document is determined as being inappropriate for being stored into the information storage frame because of the number of characters. The document is thus stored in the information storage frame.

The fourth conventional art relates to a document processing apparatus which produces and processes a mixed mode communication document in which character information and image information are laid out in accordance with layout information. The document processing apparatus includes a display unit for displaying an information storage frame, and a modifier unit which compares the area of an information storage frame with the area of a content such as characters and images input to be stored into the information storage frame and automatically modifies the area of the information storage frame so that the information storage frame accommodates the content. In another arrangement, the document processing apparatus includes the display unit, and an organizing unit which automatically modifies character spacing, and line spacing and automatically expands or contracts an image after comparing the area of an information storage frame with the area of a content such as characters and images input to be stored in the information storage frame so that the information storage frame accommodates the content.

If a digital content is mechanically laid out in an editing process thereof, legibility and good appearance may be destroyed, and for this reason, a designer designs beforehand several templates for layout so that the digital content is edited to the layout intended by the designer based on the layout template. In this case, the digital content is desirably edited to the layout intended by the designer, regardless of the content, the amount, and the logical structure of the information to be posted.

In accordance with the latter arrangement of the fourth conventional art and the third conventional art, the information to be posted is stored into the information storage frame by modifying the character font size, pitch of the document, and line pitch. The shape and location of the information storage frame are thus set as intended by a designer to some degree. In the digital content laid out, the information storage frame in which the character font, etc., is changed is different in form from the information storage frame in which the character font remains unchanged. This arrangement destroys the layout consistency of the content.

In the former arrangement of the fourth conventional art, the area of the information storage frame is automatically modified so as to store the content. The probability that the layout consistency of the content will be destroyed by the change of character font, etc is low. But there is a probability that the shape and location of the information storage frame are not arranged in a layout desired by the designer, depending on the amount of information to be posted.

In another arrangement, the overflowed information to be posted may be stored into an information storage frame on another page when the information storage frame is not sufficient to store the information to be posted with the portion thereof overflowed. In this way, it is expected that the shape and location of the information storage frame are arranged in a layout desired by the designer and the probability that the layout consistency is destroyed by the change of character fonts is low.

However, if the overflowed information is merely stored into another information storage frame, it is very difficult for a user or a deliverer to control the order of posting the information. For example, summaries of economy and sports are posted on pages 1 through 4, economy is detailed on and after page 5, and sports are detailed on pages subsequent to the economy pages. If the summary of sports is overflowed from page 4 in the arrangement that the overflowed information is merely stored into another information storage frame, the overflowed information may be posted onto page 5, which is originally intended as a space for the detail of economy. Since the overflowed information is related to sports, it is preferably discarded or posted on a page reserved for sports related matter.

SUMMARY OF THE INVENTION

The present invention has been developed to resolve the problem of the above-referenced conventional arts, and it is an object of the present invention to provide a digital content production system and a digital content production program, which is appropriate for use in preventing a layout intended by a designer from being destroyed, keeps the consistency of layout of a document, and prevents the order of posting information from being disturbed by the generation of overflow of information.

To achieve the above object, a digital content production system of the present invention can include a content storage device for storing registered digital contents, a content selection device for selecting digital contents for arrangement in the content storage device, and a content production device for producing a digital content for output by determining an output layout of the digital contents for arrangement selected by the content selection device. The content production device can produce the digital content for output by arranging information to be posted forming the digital contents for arrangement into a predetermined frame in a layout area. Moreover, the content production device can produce the digital content for output by storing the information to be posted into a plurality of information storage frames, which are associated with each other and arranged in the layout area for containing the information to be posted, and when the information storage frame is not sufficient to store the information to be posted, overflowed information to be posted that cannot be stored in the information storage frame is stored into an information storage frame associated with the information storage frame.

In this arrangement, the content selection device can select the digital contents for arrangement in the content storage device, and the content production device arranges the information to be posted forming the selected digital contents for arrangement into the predetermined frames in the layout area. The digital content for output is produced in this way.

In the layout process, the content production device can store the information to be posted into the plurality of information storage frames arranged in the layout area. When the information storage frame is not sufficient to store the information to be posted with a portion thereof overflowed, the overflowed information is stored into another information storage frame associated with the information storage frame.

The information storage frame may be dynamically arranged in the layout area when the digital contents for arrangement is laid out. Alternatively, the information storage frame may be arranged in the layout area based on layout definition information which is prepared beforehand to define the state that the plurality of information storage frames is arranged in the layout area. The same is true of a digital content production program.

The information to be posted includes text information, image information and other information. The same is true of the digital content production program.

The content storage device can store the registered digital contents by any technique at any time. The content storage device may store beforehand the registered digital content, alternatively, without storing beforehand the registered digital content, the content storage device stores the registered digital content when it is input from outside during the operation of the system. The same is true of the digital content production program.

The system may be embodied in a single apparatus, or in a network system in which a plurality of terminals is connected to each other to allow communication. In the latter case, each component of the system can be contained in any of the terminals as long as the components remain capable of communicating to each other.

The output layouts include a display layout according to which the digital content for output is presented on a screen, and a print layout according to which the digital content for output is printed out on a sheet of paper. The same is true of the digital content production program.

A digital content production system of the present invention can further includes layout definition information storage device for storing layout definition information that defines a state in which the plurality of information storage frames are associated with each other and arranged in the layout area. Moreover, the content production device stores the information to be posted into the plurality of information storage frames by referencing the layout definition information in the layout definition information storage device, thereby producing the digital content for output containing a plurality of layout areas on a one layout area per page basis. Also, the overflowed information to be posted is stored into an information storage frame associated with the information storage frame when the information storage frame is not sufficient to fully store the information to be posted.

In this arrangement, the content production device can reference the layout definition information in the layout definition information storage device and stores the information to be posted in the plurality of information storage frames arranged in the layout area during the layout process. When the information storage frame is unable to entirely accommodate the information to be posted with a portion thereof overflowed, the overflowed information to be posted is stored into an information storage frame associated with the information storage frame.

The layout definition information storage device can store the layout definition information by any technique at any time. The layout definition information storage device stores beforehand the layout definition information. Alternatively, the layout definition information storage device may store the layout definition information input from outside during the operation of the system, without storing beforehand the layout definition information.

In the digital content production system of the present invention, the digital content production device can store the information to be posted or the overflowed information to be posted into the plurality of associated information storage frames in order of increasing page number of the layout areas to which the information storage frames are assigned.

In this arrangement, the content production device stores the information to be posted or the overflowed information thereof into the plurality of associated information storage frames in order of increasing page number of the layout areas to which the information storage frames are assigned.

In a digital content production system of the present invention, when the information storage frame that stores the end of the overflowed information to be posted is associated with a flow destination information storage frame for storing the overflowed information to be posted, the content production device disengages the association between the two information storage frames.

In this arrangement, when the information storage frame that stores the end of the overflowed information to be posted is associated with the flow destination information storage frame for storing the overflowed information to be posted, the content production device disengages the association between the two information storage frames.

The association may be disengaged by deleting the flow destination information storage frame, by associating the flow destination information storage frame with another information storage frame, or by leaving the flow destination information storage frame dissociated from any information storage frame to assure freedom of user.

In a digital content production system of the present invention, when the information storage frame which is not sufficient to store the information to be posted or the overflowed information to be posted is not associated with a flow destination information storage frame for storing the overflowed information to be posted, the content production device can discard pieces of the information to be posted or of the overflowed information to be posted that are not fully stored in the information storage frame.

In this arrangement, when the information storage frame which is not sufficient to store the information to be posted or the overflowed information to be posted is not associated with a flow destination information storage frame for storing the overflowed information to be posted, the content production device discards pieces of the information to be posted or of the overflowed information to be posted that are not fully stored in the information storage frame.

The information that is not stored may be discarded by simply discarding it. If the information to be posted or the overflowed information is text information, the information may be discarded by column, by sentence, or by word. For example, when the information is discarded by column, content of a column of the information to be posted or the overflowed information, which can be stored in the information storage frame, is stored in the information storage frame. The content of the other column is discarded. The same is true of the case that the information is discarded by sentence or by word. If the information is discarded by column, by sentence, or by word, the resulting layout may be easy to see compared to when the information is simply discarded.

In a digital content production system of the present invention, when the information storage frame which is not sufficient to store the information to be posted or the overflowed information to be posted is not associated with a flow destination information storage frame for storing the overflowed information to be posted, the content production device can arrange a new flow destination information storage frame in a layout area of an end page and stores pieces of the information to be posted or of the overflowed information to be posted that are not fully stored in the information storage frame, into the new flow destination information storage frame.

In this arrangement, when the information storage frame which is not sufficient to store the information to be posted or the overflowed information to be posted is not associated with the flow destination information storage frame for storing the overflowed information to be posted, the content production device can arrange the new flow destination information storage frame in the layout area of the end page and stores pieces of the information to be posted or of the overflowed information to be posted that are not fully stored into the information storage frame, into the new flow destination information storage frame.

The storage of the information that is not stored is performed by merely storing it. If the information to be posted or the overflowed information is text information, the information may be stored by column, by sentence, or by word. For example, when the information is stored by column, content of a column of the information to be posted or the overflowed information, which can be stored in the information storage frame, is stored in the information storage frame. The content of other column is stored into the new information storage frame. The same is true of the case that the information is stored by sentence or by word. If the information is stored by column, by sentence, or by word, the resulting layout may be easy to see compared to when the information is simply stored.

In a digital content production system of the present invention, when the information storage frame which is not sufficient to store the information to be posted or the overflowed information to be posted is not associated with a flow destination information storage frame for storing the overflowed information to be posted, the content production device can arrange a new flow destination information storage frame in a layout area on a next page, and stores pieces of the information to be posted or of the overflowed information to be posted that are not fully stored into the information storage frame, into the new flow destination information storage frame.

In this arrangement, when the information storage frame which is not sufficient to store the information to be posted or the overflowed information to be posted is not associated with the flow destination information storage frame for storing the overflowed information to be posted, the content production device can arrange the new flow destination information storage frame in the layout area on the next page, and stores pieces of the information to be posted or of the overflowed information to be posted that are not fully stored into the information storage frame, into the new flow destination information storage frame.

In a digital content production system of the present invention, when one information storage frame and another information storage frame, among the plurality of associated information storage frames, are arranged straddling across pages, the one information storage frame and the other information storage frame store the information to be posted or the overflowed information to be posted, and when a blank page having any layout area containing neither information to be posted nor overflowed information to be posted therewithin is present between the pages which have the one information storage frame and the other information storage frame, the content production device can delete the layout area of the blank page.

In this arrangement, when one information storage frame and another information storage frame, among the plurality of information storage frames, are arranged straddling across pages, the one information storage frame and the another information storage frame store the information to be posted or the overflowed information to be posted, and when the blank page is present between the pages which have the one information storage frame and the another information storage frame, the content production device deletes the layout area of the blank page.

In a digital content production system of the present invention, when the information storage frame storing the overflowed information to be posted overlaps another information storage frame, the content production device can determine the shape or location of the another information storage frame within the layout area so that the information storage frame does not overlap the another information storage frame.

In this arrangement, when the information storage frame storing the overflowed information to be posted overlaps another information storage frame, the content production device determines the shape or location of the another information storage frame within the layout area so that the information storage frame does not overlap the another information storage frame.

In a digital content production system of the present invention, when the information storage frame storing the overflowed information to be posted overlaps another information storage frame, the content production device can determine the shape or location of the information storage frame storing the overflowed information to be posted within the layout area so that the information storage frame does not overlap the another information storage frame.

In this arrangement, when the information storage frame storing the overflowed information to be posted overlaps another information storage frame, the content production device determines the shape or location of the information storage frame storing the overflowed information to be posted within the layout area so that the information storage frame does not overlap the another information storage frame.

In a digital content production system of the present invention, the information storage frames are associated with each other by attaching identification information to each information storage frame. When the information storage frame with the identification information attached thereto is not sufficient to fully store the information to be posted, the content production device can store the overflowed information to be posted into an information storage frame having identification information corresponding to the identification information of the information storage frame.

In this arrangement, when the information storage frame with the identification information attached thereto is not sufficient to fully store the information to be posted, the content production device stores the overflowed information to be posted into the information storage frame having identification information corresponding to the identification information of the information storage frame.

In a digital content production system of the present invention, a plurality of different pieces of identification information can be attached to one information storage frame. In this arrangement, when the plurality of pieces of identification information are attached to a flow source information storage frame for storing the front of the information to be posted, the content production device can store the overflowed information into a plurality of different information storage frames associated with the flow source information storage frame. When a plurality of different pieces of identification information are attached to a flow destination information storage frame for storing the overflowed information to be posted, the content production device can store any of pieces of the overflowed information to be posted generated from a plurality of different information storage frames into the flow destination information storage frame. When the identification information is attached to both the flow source information storage frame and the flow destination information storage frame, each of the above advantages is provided.

In a digital content production system of the present invention, the plurality of different pieces of identification information are attached to a flow destination information storage frame for storing the overflowed information to be posted. When a plurality of pieces of overflowed information are generated from the information storage frame having the identification information corresponding to the identification information of the flow destination information frame, the content production device can select from among the plurality of pieces of identification information of the flow destination information storage frame the identification information which corresponds to the identification information of the information storage frame with the information to be posted overflowed therefrom, and which corresponds to a predetermined turn in attaching order of the identification information with respect to the flow destination information storage frame, and then stores, into the flow destination information frame, the information to be posted overflowed from the information storage frame having the identification information corresponding to the selected identification information.

In this arrangement, when the plurality of pieces of overflowed information are generated in the information storage frame having the identification information corresponding to the identification information of the flow destination information frame, the content production device can select from among the plurality of pieces of identification information of the flow destination information storage frame the identification information which corresponds to the identification information of the information storage frame with the information to be posted overflowed therefrom, and which corresponds to a predetermined turn in attaching order of the identification information with respect to the flow destination information storage frame. The content production device then stores, into the flow destination information frame, the information to be posted overflowed from the information storage frame having the identification information corresponding to the selected identification information.

In a digital content production system of the present invention, the identification information functions as a keyword, and when the information storage frame having the identification information is not sufficient to store the information to be posted, the content production device can store the overflowed information to be posted into an information storage frame with identification information having meaning identical to or similar to that of the identification information of the information storage frame.

In this arrangement, when the information storage frame having the identification information is not sufficient to store the information to be posted, the content production device stores the overflowed information to be posted into an information storage frame with identification information having meaning identical to or similar to that of the identification information of the information storage frame.

A digital content production system of the present invention, further includes user information storage device for storing user information relating to a user, wherein the content selection device can select the digital contents for arrangement in the content storage device in accordance with the user information in the user information storage device.

In this arrangement, the content selection device selects the digital contents for arrangement in the content storage device in accordance with the user information in the user information storage device.

The user information includes the age, sex, interests and preference, the home address, and the name of the user, and the operational environment of a user terminal.

The user information storage device stores the user information by any technique at any time. The user information storage device may store beforehand the user information. Alternatively, the user information storage device may store the user information input from outside during the operation of the system, without storing beforehand the user information.

A digital content production system of the present invention, further includes user information storage device for storing user information relating to a user, wherein the content production device determines an output layout of the digital contents for arrangement, selected by the content selection device, in accordance with the user information in the user information storage device.

In this arrangement, the content production device determines the output layout of the selected digital contents for arrangement based on the user information in the user information storage device.

For example, when the age information, if included in the user information, indicates that the user is an aged person in the determination of the output layout based on the user information, a relatively large font may be used. When the sex information, if included in the user information, indicates that the user is a female, a rounded font may be employed. If the preference and interest information is included in the user information, the layout can be like that of magazines intended for children, that of sport papers, or that of technical documents. If the user information includes the home address of the user, the layout may be presented with scenery of the location of the address as a background. If the user information includes the name of the user, the layout may have the name on it as the title thereof. When the operational environment information relating to the user terminal, if included in the user information, indicates that the capacity of a RAM in the user terminal is too small, the layout may be designed so that the amount of data of the image thereof is also small.

To achieve the above object, the present invention is related to a digital content production program that can include a computer system, that performs a process of the content production device. Moreover, the content production device can produce the digital content for output by storing the information to be posted into the plurality of information storage frames with the plurality of information storage frames for storing the information to be posted being associated to each other and arranged in the layout area. Also, when the information storage frame is not sufficient to store the information to be posted, the overflowed information to be posted left out of the information storage frame is stored into another information storage frame associated with the information storage frame.

In this arrangement, the digital content production system reads the program, and executes the process in accordance with the read software program. The program has thus the same advantage as that of the digital content production system as described above.

BRIEF DESCRIPTION OF THE DRAWINGS

The invention will describe with a reference to the accompanying drawings, in which like numerals reference like elements, and wherein:

FIG. 4 illustrates the data structure of a user profile table 300;

FIG. 8 illustrates a digital content and the data structure of a category number definition table 340;

FIG. 18 illustrates a portion of the data structure of the layout definition file.

DETAILED DESCRIPTION OF PREFERRED EMBODIMENTS

Figure 1:
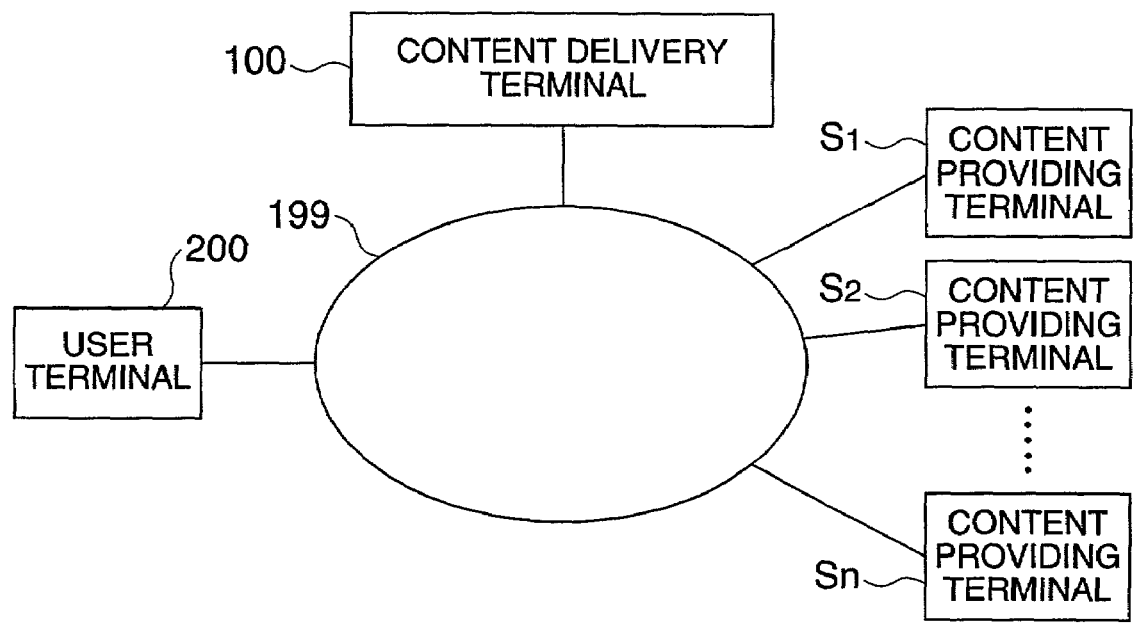
FIG. 1 is a block diagram illustrating the construction of a network in which the present invention is applied.

An embodiment of the present invention is discussed hereinafter referring to the drawings. FIGS. 1 through 15 show embodiments of a digital content production system and a digital content production program of the present invention.

FIG. 1 shows the digital content production system and the digital content production program of the present invention in which a content delivery terminal 100 delivers a digital content such, as news, to a user terminal 200.

The construction of a network system implementing the present invention is discussed referring to FIG. 1. FIG. 1 is an exemplary block diagram showing the construction of the network system implementing the present invention.

Connected to the Internet 199 are a plurality of content providing terminals $S_1$–$S_n$ for providing digital contents, the content delivery terminal 100 for collecting, storing, and delivering digital contents provided by the content providing terminals $S_1$–$S_n$, and the user terminal 200 used by a user as shown in FIG. 1. Although a single user terminal 200 is shown for simplicity, a plurality of user terminals can actually be connected to the Internet 199.

Each of the content providing terminals $S_1$–$S_n$, having the same function as that of a typically available computer, includes a CPU, an ROM, an RAM, and an I/F, with all of these interconnected to each other through a bus. When the content providing terminal produces a digital content, the terminal adds a category number to the digital content to identify a category of the digital content, and transmits the digital content to the content delivery terminal 100. The category number will be described in greater detail below.

The user terminal 200, having the same function as that of a typically available computer, includes a CPU, an ROM, an RAM, and an I/F, with all of these interconnected to each other through a bus. The user terminal 200 can also be equipped with a WWW (World Wide Web) browser, and accesses the content delivery terminal 100 using the WWW browser.

Figure 2:
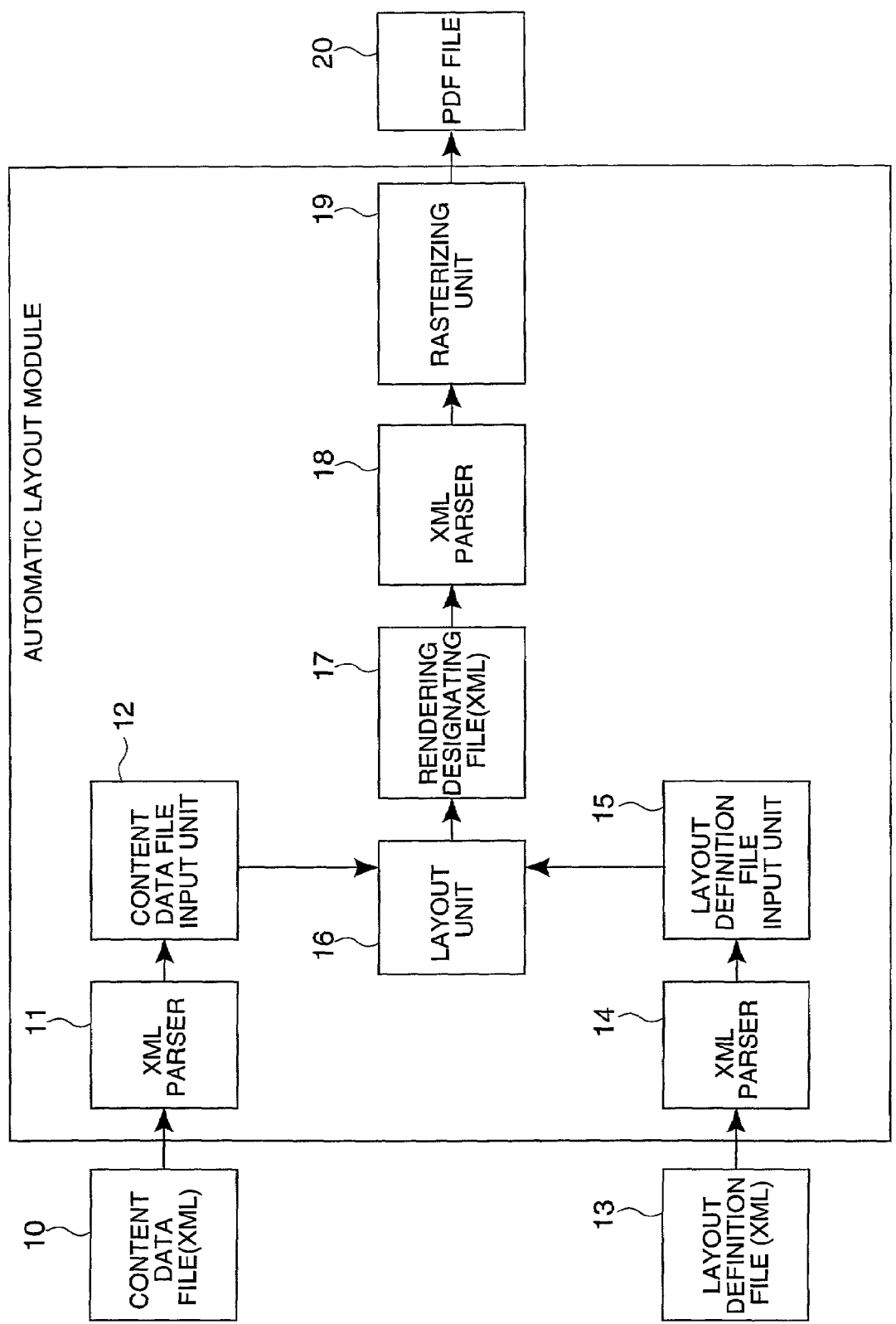
FIG. 2 is a functional block diagram schematically illustrating the function of a content delivery terminal 100.

The schematic function of the content delivery terminal 100 will now be discussed in detail, referring to FIG. 2. FIG. 2 is an exemplary block diagram showing the schematic function of the content delivery terminal 100.

Referring to FIG. 2, the content delivery terminal 100 can include an XML parser 11 for parsing a content data file 10 in an XML (eXtensible Markup Language), a content data file input unit 12 for inputting the content data file 10 parsed by the XML parser 11, an XML parser 14 for analyzing an XML layout definition file 13, a layout definition file input unit 15 for inputting the layout definition file 13 parsed by the XML parser 14, a layout unit 16 for performing a layout process based on the content data file 10 and the layout definition file 13 respectively received through the input units 12 and 15, an XML parser 18 for parsing an XML rendering designating file 17 from the layout unit 16, and a rasterizing unit 19 for producing a file 20 in a PDF (Portable Document Format) by performing rendering based on the rendering designating file 17 parsed by the XML parser 18. Particularly, the feature of the present embodiment lies in the layout unit 16 among other components.

Figure 3:
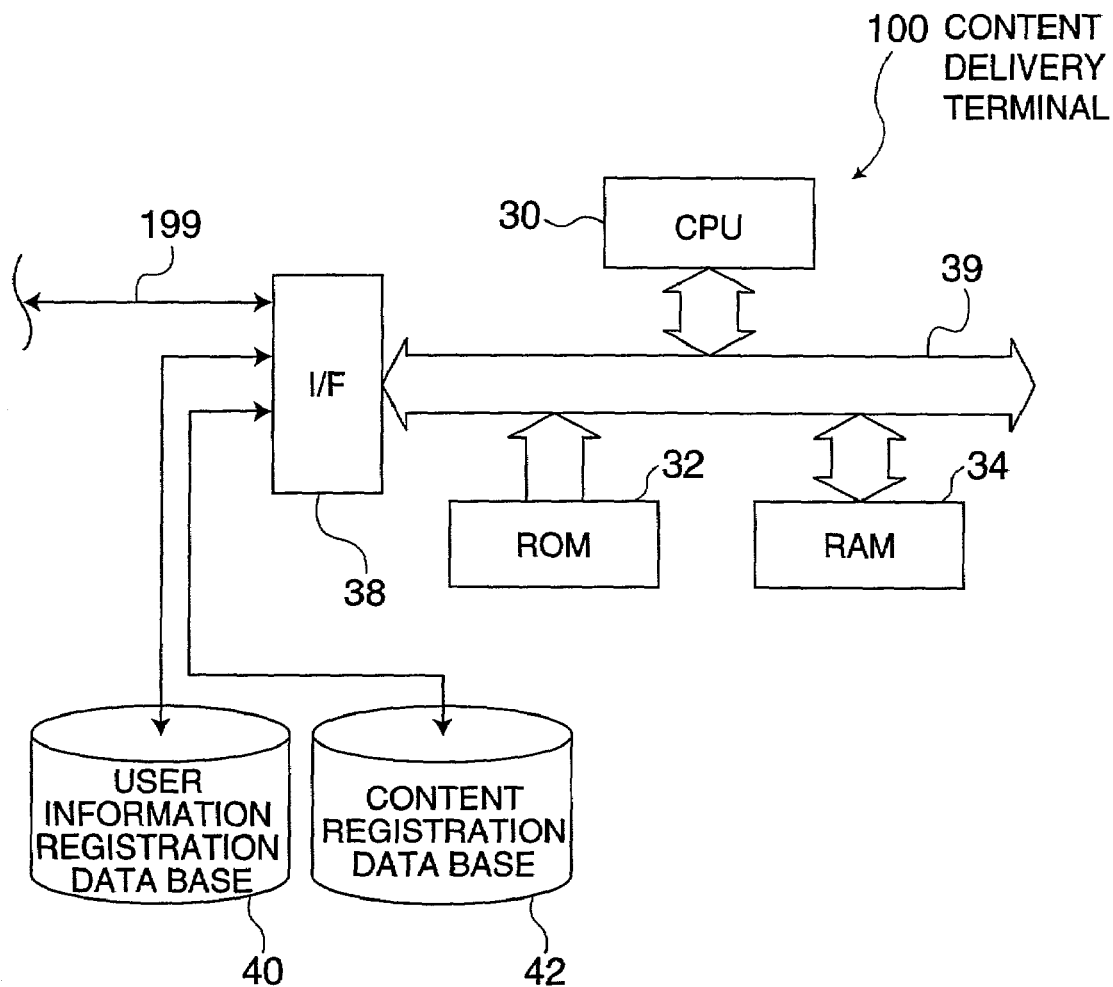
FIG. 3 is a block diagram illustrating the construction of the content delivery terminal 100.

Referring to FIG. 3, the content delivery terminal 100 will now be discussed in detail. FIG. 3 is an exemplary block diagram illustrating the construction of the content delivery terminal 100.

Referring to FIG. 3, the content delivery terminal 100 can include a CPU 30 for performing arithmetic operation and controlling the entire system, an ROM 32 for storing beforehand a control program, etc., of the CPU 30 in a predetermined area thereof, an RAM 34 for storing data read from the ROM 32 or the like and calculation results required in the course of the arithmetic operation of the CPU 30, and an I/F 38 for interfacing with an external device for exchange of data. To exchange data, these components are mutually interconnected by a bus 39, as a signal line for transferring data.

Connected to the I/F 38 are, as external units, a user information registration DB 40 for registering user information, a content registration DB 42 for storing digital contents supplied by content providing terminals $S_1$–$S_n$, and a signal line connected to the Internet 199.

An exemplary data structure of the user information registration DB 40 is discussed below with reference to FIG. 4. Referring to FIG. 4, the user information registration DB 40 stores a user profile table 300. FIG. 4 shows the data structure of the user profile table 300.

The user profile table 300 registers a single or a plurality of records for each user as shown in FIG. 4. Each record includes a field 302 for registering a user ID for identifying a user, a field 304 for registering a destination address where to deliver a digital content, a field 306 for registering a category number, a field 308 for registering a keyword, a field 310 for registering the date of delivery, a field 312 for registering the time of delivery, a field 314 for registering a layout number, a field 316 for registering the maximum number of pages, and a field 318 for registering a font size.

When a digital content containing a keyword designated by a user is selected as data to be delivered, the field 308 registers that keyword. The keyword may be the one that appears most frequently in the document of a category in which the user is interested. Referring to FIG. 4, a "PROCESSOR" is registered in a first row of the field 308, and an "OS" is registered in a second row of the field 308.

The field 310 registers the date of delivery on which the user desires the delivery of the digital content. For example, when the everyday delivery of the digital content is desired, "EVERYDAY" is designated. When the weekday only delivery of the digital content is desired, a "WEEKDAY" is designated. When the weekend delivery of the digital content is desired, a "WEEKEND" is designated. Referring to FIG. 4, "EVERYDAY" is registered in a first row of the field 310, and a "WEEKDAY" is registered in a second row of the field 310.

The field 312 registers the desired time of delivery of the digital content on the delivery date designated by the user. As the time of delivery, one day may be divided into 24 hours from zero hour band to twenty-third hour band, and any time band may be designated. Referring to FIG. 4, a fifth hour band is registered in a first row of the field 312, and an eleventh hour band is registered in a second row in the field 312.

The field 314 registers the layout number for identifying the output layout of the digital content. For example, the layout number identifies the output layout desired by the user. Referring to FIG. 4, layout number 2 is registered in a first row of the field 314, and layout number 5 is registered in a second row of the field 314. The layout number will be discussed in greater detail later.

The field 316 registers the maximum number of pages as the upper limit when the digital content is displayed or printed out. Designated as the maximum number of pages may be the maximum numbers of pages as the upper limit. Alternatively, the letter "u" may be designated to set no upper limit. Referring to FIG. 4, "2" pages are registered in a first row of the field 316, and the letter "u" is registered in a third row of the field 316.

The field 318 registers the font size when the digital content is displayed or printed out. Referring to FIG. 4, a "SMALL" font is registered in a first row of the field 318, and a "STANDARD" font is registered in a third row of the field 318.

Figure 5:
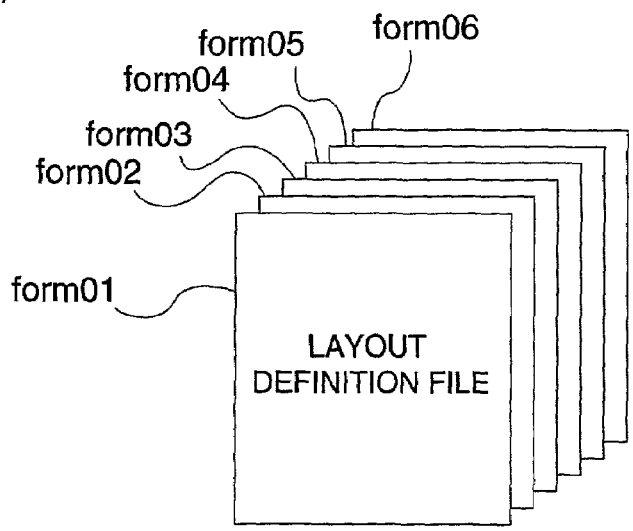
FIG. 5 illustrates a layout definition file and the data structure of a layout number definition table 330.

Referring to FIG. 5, the user information registration DB 40 stores a plurality of layout definition files form 01–form 06 defining the output layout of the digital contents, and a layout number definition table 330 for indicating the correspondence between the layout definition files form 01–form 06 and the layout numbers. FIG. 5 shows the layout definition file and the data structure of the layout number definition table 330.

The layout definition files form 01–form 06 define a text information storage frame for accommodating text information, the size and layout position of an image contained in the digital content in a printing sheet, the size, the type and color of a font of the text information, a character pitch and a line pitch, and the number of, the quality of, the size of, and the ratio of images. The layout definition files are described in the XML, etc.

Referring to FIG. 5(b), the layout number definition table 330 registers a single record for each layout number. Each record includes a field 332 for registering the layout number, and a field 334 for registering a file name of the layout definition file. As shown in FIG. 5(b), a first record registers "1" as a layout number, and "form01" as a layout definition file name, and a second record registers "2" as a layout number, and "form02" as a layout definition file name.

Figures 6, 7:
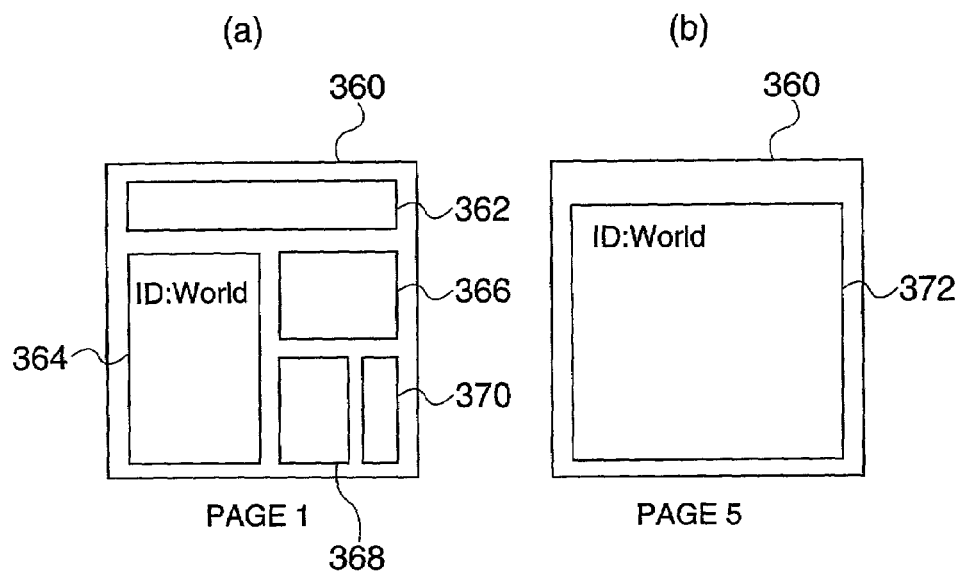
FIG. 6 illustrates a portion of the data structure of the layout definition file.
FIG. 7 illustrates the data structure of a flow management table 400.

The data structure of the layout definition files form 01–form 06 is discussed hereinafter with reference to FIG. 6. FIG. 6 shows a portion of the data structure of the layout definition file. The layout definition files form 01–form 06 are different from each other in data structure, and typical files are now discussed.

The layout definition file form 01 includes a layout area 360 on each page. Referring to FIG. 6(a), one layout area 360 on a first page includes a title information storage frame 362 for storing title information, a text information storage frame 364 for storing text information, an image information storage frame 366 of storing image information, an image information storage frame 368, and a text information storage frame 370. As an ID, "World" is attached to the text information storage frame 364.

Referring to FIG. 6(b), a text information storage frame 372 is arranged in the layout area 360 on page 5. The text information storage frame 372 has an ID "World" identical to the one attached to the text information storage frame 364. The text information storage frame 364 is associated with the text information storage frame 372 by the ID, and when the text information storage frame 364 is not sufficient to store text information with a portion thereof overflowed, the flow object not stored in the text information storage frame 364 is stored into the text information storage frame 372. The flow object here refers to a portion of text information and other information which is not stored in and overflowed from a preceding page or a current page.

FIG. 6 illustrates a pair of text information storage frames associated with each other. It should be understood that the present invention is not limited to this arrangement. Alternatively, any number of text information storage frames desired to be associated is mutually associated using the same ID different from other Ids, depending on the design by a designer.

The user information registration DB 40 generates and stores a flow management table 400 for managing flow objects so as to lay out digital contents as shown in FIG. 7. FIG. 7 illustrates the data structure of the flow management table 400.

Referring to FIG. 7, the flow management table 400 stores a single record for each object overflowed from the text information storage frame. Each record includes a field 402 which registers a document number identifying the flow object, a field 404 which registers a front position (an overflow position) of the flow object of the text information, a field 406 which registers an ID attached to the text information storage frame from which the flow object is generated, a field 408 which registers a page number (of the page of the overflow source) of the information storage frame from which the flow object is generated, a field 410 which registers a page number (of the page storing the flow object) of the text information storage frame that stores the end of the flow object, and a field 412 which registers a finish flag which indicates whether or not the flow object has been processed.

In the flow management table 400, a flow object is processed on an FIFO (First In First Out) basis. When flow object is overflowed for the first time, a record thereof is registered at the of the flow management table 400, and an unprocessed flow object is processed starting with the top of the flow management table 400. An exception to this rule occurs when an overflow takes place again when a new information storage frame is not sufficient to accommodate a processed object as a result of processing of an unprocessed flow object. The corresponding record is registered at the top of the flow management table 400. By registering the record at the top of the flow management table 400 to process it with priority, the content of the document is prevented from being dispersed straddling across a number of pages.

An exemplary data structure of the content registration DB 42 will now be discussed with reference to FIG. 8. Referring to FIG. 8, the content registration DB 42 stores a category number definition table 340 that shows the relationship between the digital contents supplied from the content providing terminals $S_1$–$S_n$, the main category, the subcategory, and the category number. FIG. 8 shows the digital contents and the data structure of the category number definition table 340.

As shown in FIG. 8(a), the digital contents supplied by the content providing terminals $S_1$–$S_n$ are tagged with the respective document numbers and category numbers, and the content delivery terminal 100 classifies the digital contents using the category number by category, and registers the classified digital contents in the content registration DB 42. When registering, the content delivery terminal 100 references the category number definition table 340, and adds, besides a document number and a category number, the main category, and the sub-category to the digital contents for registration. In connection with the digital content, a single document includes title information indicating the title of the document, image information relating to an image of the document, and text information relating to a text of the document.

Referring to FIG. 8(b), the category number definition table 340 registers a single record per the main category and the sub-category. Each record includes a field 342 for registering a category number, a field 344 for registering a main category, and a field 346 for registering a sub-category. As shown in FIG. 8(b), a first row record registers "1102" as the category number, "WORLD NEWS" as the main category, and "U.S." as the sub-category, and a sixth row record registers "2010" as the category number, "SPORTS" as the main category, and "BASEBALL" as the sub-category.

The construction of the CPU 30 and the process executed by the CPU 30 will be discussed referring to FIG. 9 and FIG. 10.

Figure 9:
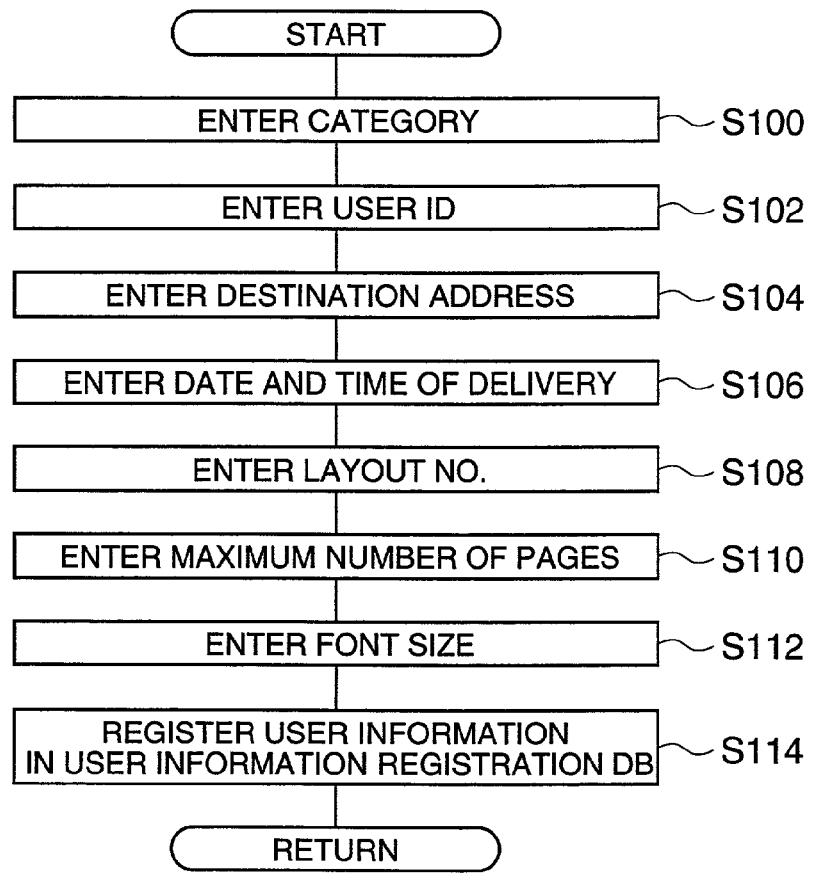
FIG. 9 is a flow diagram illustrating a user registration process.
Figure 10:
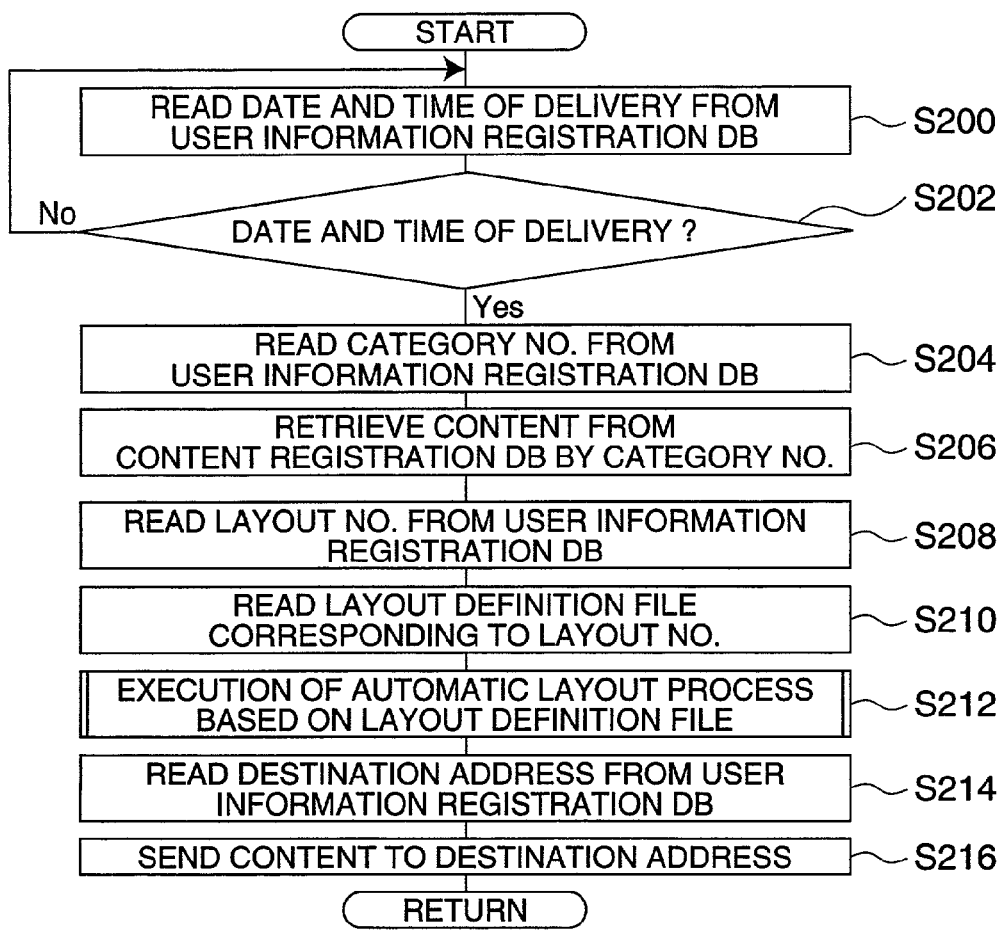
FIG. 10 is a flow diagram illustrating a content delivery process.

The CPU 30, composed of a micro processor unit MPU, starts a predetermined program stored in a predetermined area of the ROM 32, and executes a user registration process and a content delivery process in a time division manner in flow diagrams shown in FIG. 9 and FIG. 10.

Referring to FIG. 9, the user registration process will be discussed in detail. FIG. 9 is a flow diagram showing the user registration process.

When the user has accessed the system, the user registration process requests the user to input the required user information such as the user ID, and registers the input user information in the user profile table 300. When the CPU 30 starts, the process goes to step S100 shown in FIG. 9. An input operation in each of the following steps is performed interactively with the user.

ID and the password are entered. In step S104, the destination address is input, and in step S106, the date and time of delivery are input, and the process proceeds to step S108.

In step S108, the layout number is input. In step S110, the maximum number of pages is input. In step S112, the font size is input. The process proceeds to step S114, where the CPU 30 registers user information input in steps S100–S112 in the user profile table 300. The CPU 30 ends the process, and then returns to the original process.

Referring to FIG. 10, the content delivery process will be discussed in detail. FIG. 10 is a flow diagram showing the content delivery process.

The content delivery process delivers the digital content to the user terminal 200 by referencing the user profile table 300. Referring to FIG. 10, when the CPU 30 starts, the process proceeds to step S200. The process of the following steps is performed for each record of the user profile table 300. In practice, each step is performed by the number of times equal to the number of records registered in the user profile table 300.

In step S200, the date and time of delivery are read from the user profile table 300. In step S202, the CPU 30 determines, from the read date and time of delivery, whether it is the day and time on which the digital content must be delivered. When the CPU 30 determines that it is the day and time on which the digital content must be delivered (i.e., Yes), the process proceeds to step S204, else (i.e., No) the process returns to step S200.

In step S204, the CPU 30 reads the category number from the user profile table 300. In step S206, the CPU 30 searches for the digital content in the content registration DB 42 in accordance with the read category number, and retrieves the digital content having a category number matching the read category number. The process proceeds to step S208.

In step S208, the CPU 30 reads the layout number from the user profile table 300. In step S210, the CPU 30 references a layout number definition table 330, and reads the layout definition file corresponding to the read layout number from the user information registration DB 40. In step S212, the CPU 30 performs an automatic layout process in which the output layout of the digital content retrieved in step S206 is determined based on the read layout definition file, and thereby the digital content is produced. The process then proceeds to step S214.

In step S214, the CPU 30 reads the destination address from the user profile table 300. In step S216, the CPU 30 delivers the produced digital content to the read destination address. The CPU 30 ends the above series of process steps and returns to the original process.

Figure 11:
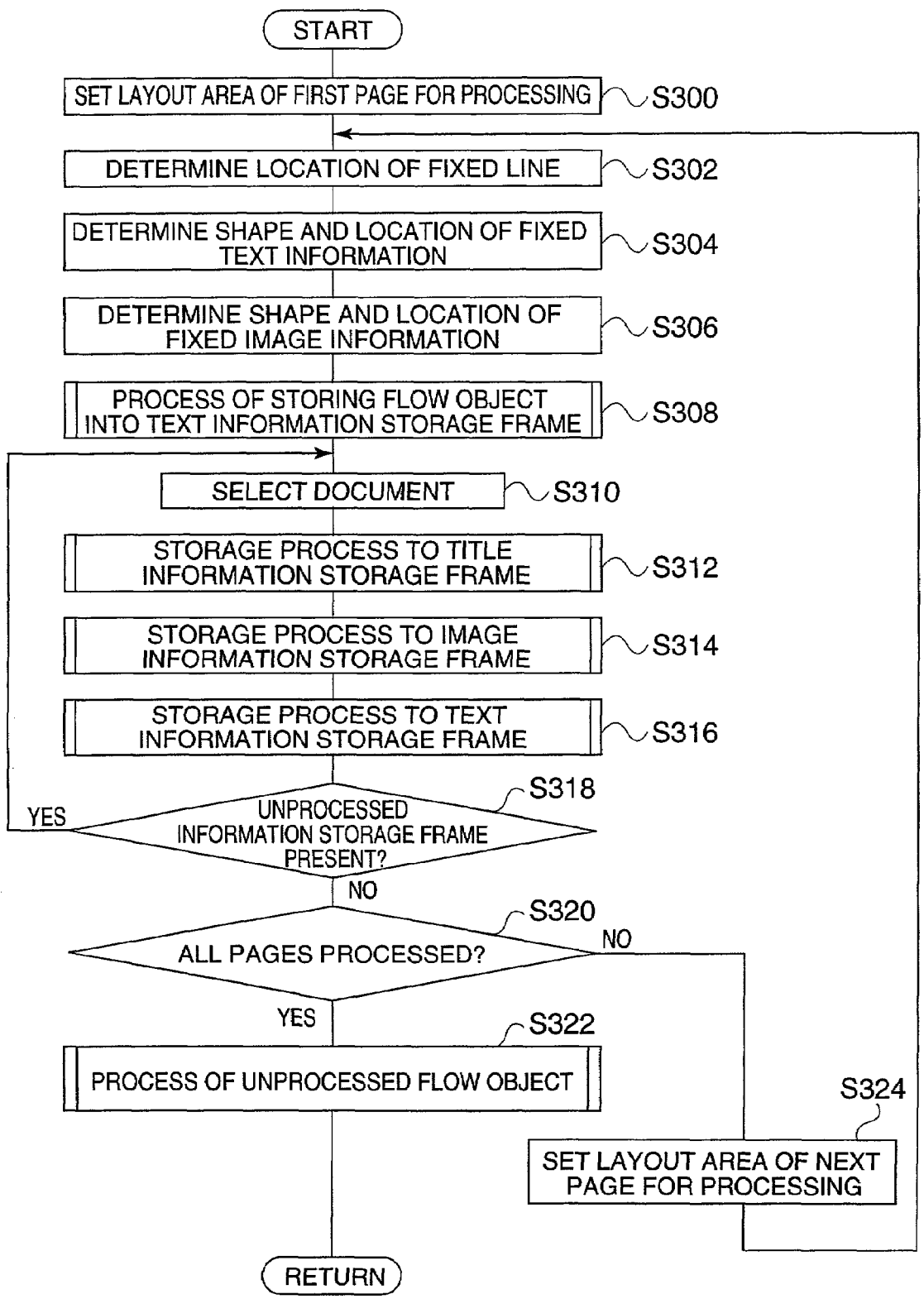
FIG. 11 is a flow diagram illustrating an automatic layout process.

The automatic layout process in step S212 is discussed in detail below with reference to FIG. 11. FIG. 11 is a flow diagram showing the automatic layout process.

When the automatic layout process is initiated in step S212, the process proceeds to step S300, as shown in FIG. 11.

In step S300, the CPU 30 sets the layout area 360 on the first page in the layout definition file read in step S210 as an object to be processed. In step S302, the location of a fixed line arranged to be stationary within the page is determined. In step S304, the shape and the location of fixed text information arranged to be stationary within the page are determined. In step S306, the shape and location of fixed image information arranged to be stationary within the page are determined. The routine proceeds to step S308.

In step S308, the process of determining the shape and location of a text information storage frame storing a flow object is performed and the flow object is stored into the text information storage frame. In step S310, a document to be arranged in the layout area 360 is selected from among digital contents retrieved in step S206. The process proceeds to step S312.

In step S312, a process of determining the shape and location of a title information storage frame based on the document selected in step S310 and storing the title information contained in the selected document into the title information storage frame is performed. In step S314, a process of determining the shape and location of an image information storage frame based on the selected document and storing the image information contained in the selected document into the image information storage frame is performed. In step S316, a process of determining the shape and location of a text information storage frame based on the selected document and storing the text information contained in the selected document into the text information storage frame is performed. The process then proceeds to step S318.

In step S318, the CPU 30 determines whether an unprocessed information storage frame is present within the layout area 360. When it is determined that no unprocessed information storage frame is present (i.e., No), the process proceeds to step S320. The CPU 30 determines whether process steps S302–S318 have been completed for all pages in the layout definition file read in step S210. When it is determined that all pages have been processed (i.e., Yes), the routine proceeds to step S322. A process of posting an unprocessed flow object is performed. The CPU 30 ends the process and then returns to the original process.

When it is determined in step S320 that process steps S302–S318 have not been completed for all pages in the layout definition file read in step S210 (i.e., No), the process proceeds to step S324. The layout area 360 on a next page in the layout definition file read in step S210 is set as an object to be processed, and the process returns to step S302.

When it is determined in step S318 that an unprocessed information storage frame is present in the layout area 360 (i.e., Yes), the process proceeds to step S310.

Figure 12:
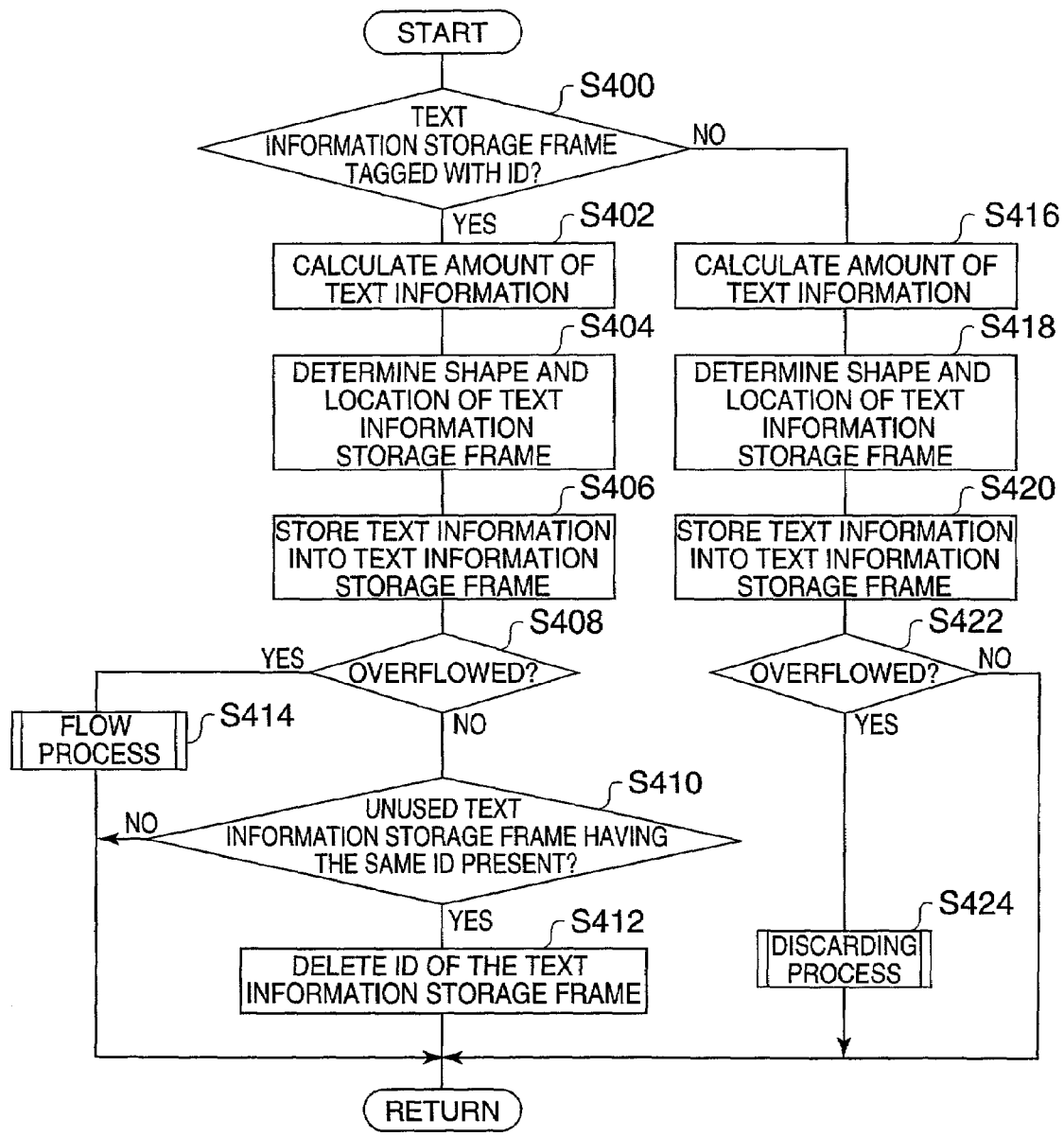
FIG. 12 is a flow diagram illustrating the storage process to a text information storage frame in step S316.

The storage process into the text information storage frame in step S316 is discussed below with reference to FIG. 12. FIG. 12 is a flow diagram illustrating the storage process into the text information storage frame in step S316.

The storage process to the text information storage frame stores new text information into the text information storage frame. Upon being activated in step S316, the process proceeds to step S400 as shown in FIG. 12.

Instep S400, the CPU 30 determines whether an ID is attached to the text information storage frame. When it is determined that an ID is attached to the text information storage frame (i.e., Yes), the process proceeds to step S402. The CPU 30 calculates the amount of text information contained the selected document, and the routine proceeds to step S404.

In step S404, the CPU 30 determines the shape and location of the text information storage frame based on the calculated amount of information. In step S406, the text information contained in the selected document is stored into the text information storage frame, and the process proceeds to step S408. Specifically, in step S404, the shape and location of the text information storage frame are determined so that the text information storage frame does not overlap another information storage frame, the shape and location of which have already been determined. When the text information storage frame overlaps another information storage frame the shape and location of which have already been determined, the text information storage frame is changed in shape or moved in a movable direction so that the text information storage frame becomes clear of another information storage frame. To maintain the layout intended by a designer as much as possible, change in shape and movement of the text information storage frame are preferably limited to a minimum. The direction in which the flow object is changed in shape or moved may be dynamically determined or may be determined beforehand. The same is true of a process in step S418.

It is then determined in step S408 whether the text information storage frame is sufficient to store the text information contained in the selected document. When it is determined that the text information is stored (with no portion thereof overflowed) (i.e., No), the process proceeds to step S410. It is then determined in step S410 whether an unprocessed text information storage frame having no text information stored therewithin and having the same ID as that of the current text information storage frame is present in another layout area 360. When it is determined that the unprocessed text information storage frame having the same ID is present (i.e., Yes), the process proceeds to step S412. To make the text information storage frame available for another use, the ID attached to the text information storage frame is deleted. The CPU 30 ends the above series of process steps and returns to the original process.

When it is determined in step S410 that any unprocessed text information storage frame having the same ID as that of the current text information storage frame is not present in the other layout area 360 (i.e., No), the CPU 30 ends the above series of process steps and returns to the original process.

When it is determined in step S408 that the text information storage frame is not sufficient to store the text information included in the selected document (with a portion thereof overflowed) (i.e., Yes), the routine proceeds to step S414. The CPU 30 performs a flow process for that flow object, ends the above series of process steps, and returns to the original process.

When it is determined in step S400 that the text information storage frame has no ID (i.e., No), the process proceeds to step S416. The amount of text information contained in the selected document is calculated, and the process proceeds to step S418.

In step S418, the CPU 30 determines the shape and location of the text information storage frame based on the calculated amount of information. The process proceeds to step S420. The text information contained in the selected document is stored into the text information storage frame, and the process proceeds to step S422.

It is determined in step S422 whether the text information storage frame is sufficient to store the text information contained in the selected document. When the text information storage fame stores the text information (with no portion thereof overflowed) (i.e., No), the CPU 30 ends this series of process steps and returns to the original process.

When it is determined in step S422 that the text information storage frame is not sufficient to store the text information contained in the selected document (with a portion thereof overflowed) (i.e., Yes), the process proceeds to step S424. The CPU 30 performs a process of discarding the flow object, ends the above series of process steps and returns to the original process. Specifically, in step S424, the CPU 30 may simply discard the flow object. Furthermore, the CPU 30 may discard the flow object by column, by sentence, and by word. For example, when the text information is discarded by column, a column of content of the text information, which can be stored in the information storage frame, is stored in the information storage frame. The other column of content is discarded. The same is true when the text information is handled by sentence or by word. If the text information is discarded by column, by sentence, or by word, the resulting layout may be easy to see compared to when the text information is simply discarded.

Figure 13:
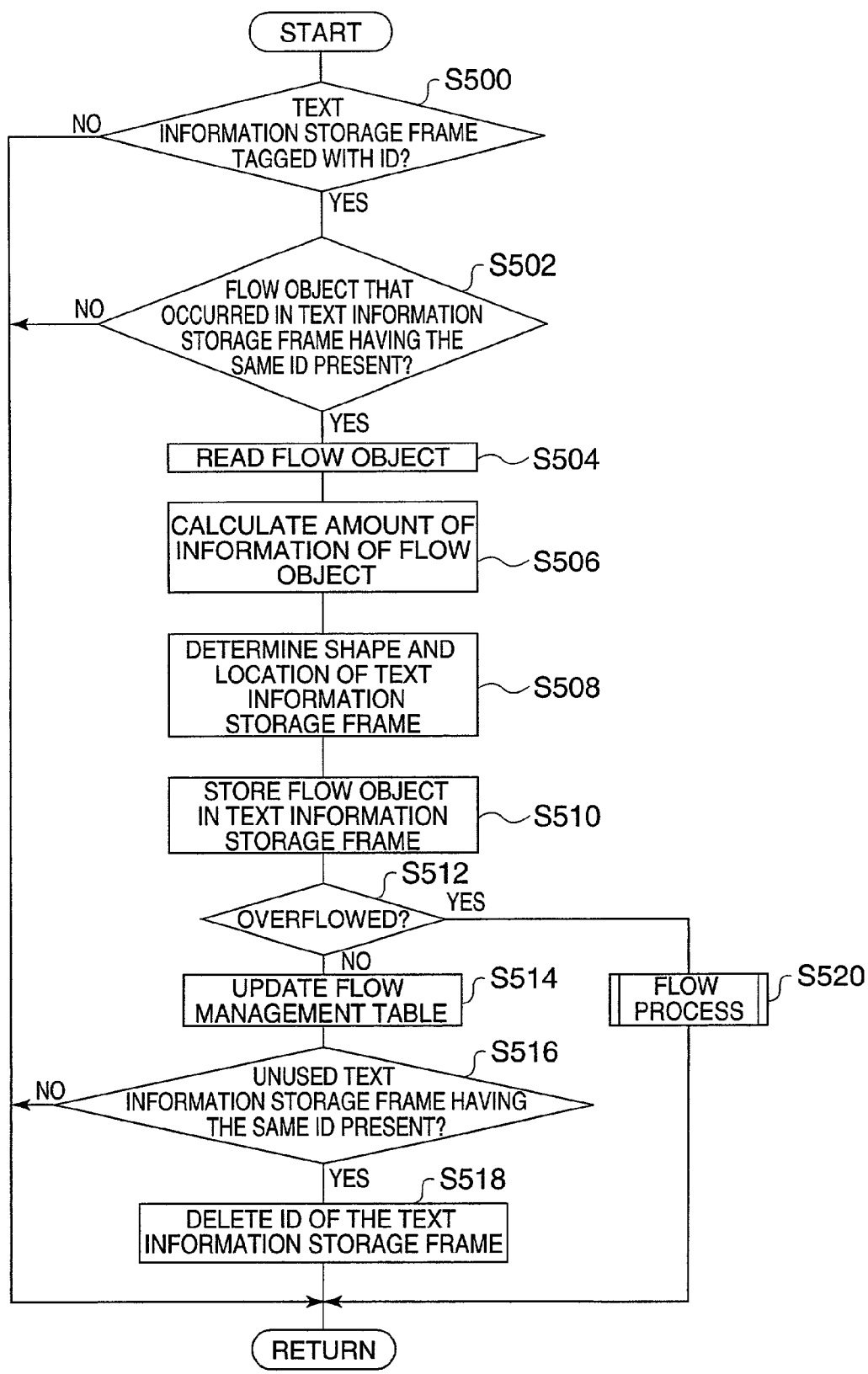
FIG. 13 is a flow diagram illustrating the storage process to a text information storage frame in step S308.

The storage process to the text information storage frame in step S308 is discussed below referring to FIG. 13. FIG. 13 is a flow diagram showing the storage process to the text information storage frame in step S308.

The storage process to the text information storage frame stores a flow object into the text information storage frame. Upon being activated in step S308, the process proceeds to step S500 as shown in FIG. 13.

In step S500, the CPU 30 determines whether an ID is attached to the text information storage frame. When it is determined that an ID is attached to the text information storage frame (i.e., Yes), the process proceeds to step S502. The CPU 30 searches for any record having the same ID as that for the current text information storage frame, and with the finish flag thereof cleared, starting from the top of the flow management table 400. When it is determined that such a record is present (i.e., Yes), the process proceeds to step S504. Referencing the record, the CPU 30 reads the flow object, and proceeds to step S506. The amount of information of the read flow object is then calculated. The process proceeds to step S508.

In step S508, the CPU 30 determines the shape and location of the text information storage frame based on the calculated amount of information. The process proceeds to step S510. The read flow object is then stored into the text information storage frame, and the process proceeds to step S512.

It is then determined in step S512 whether the text information storage frame has fully stored the read flow object. When it is determined that the text information storage frame has fully stored the read flow object (with no portion thereof overflowed) (i.e., No), the process proceeds to step S514. The storage page number of the flow object is set as a current page number in the record, and the finish flag is set. The process proceeds to step S516.

It is then determined in step S516 whether an unprocessed text information storage frame having the same ID as that of the current text information storage frame is present in another layout area 360. When it is determined that the unprocessed text information storage frame having the same ID is present (i.e., Yes), the process proceeds to step S518. To make the text information storage frame available for another use, the ID attached to the text information storage frame is deleted. The CPU 30 ends the above series of process steps and returns to the original process.

When it is determined in step S516 that the unprocessed text information storage frame having the same ID as that of the current text information storage frame is not present in another layout area 360 (i.e., No), the CPU 30 ends the above series of process steps and returns to the original process.

When it is determined in step S512 that the text information storage frame is insufficient to store the read flow object (with a portion thereof overflowed) (i.e., Yes), the process proceeds to step S520. The CPU 30 performs a flow process for the flow object, ends the above series of process steps and returns to the original process.

When it is determined in step S502 that any record having the same ID as that for the current text information storage frame, and with the finish flag thereof cleared is not present (i.e., No), or when it is determined in step S500 that no ID is attached to the text information storage frame (i.e., No), the CPU 30 ends the series of process steps and returns to the original process.

Figure 14:
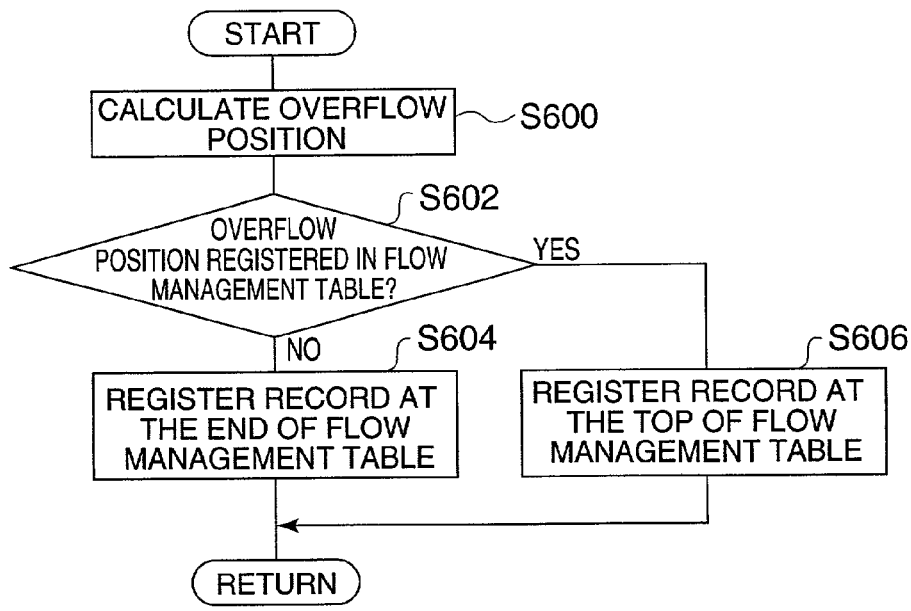
FIG. 14 is a flow diagram showing a flow process.

Referring to FIG. 14, the flow process in steps S414 and S520 is detailed below. FIG. 14 is a flow diagram showing the flow process.

Upon being activated in each of steps S414 and S520, the flow process proceeds to step S600 as shown in FIG. 14.

In step S600, the CPU 30 calculates the front position of a flow object of the text information. In step S602, it is determined whether any record, having the same document number and a cleared finish flag, is present in the flow management table 400. When it is determined that any record, having the same document number and the cleared finish flag, is not present in the flow management table 400 (i.e., No), the process proceeds to step S604. A record for the flow object is generated. The generated record is registered at the end of the flow management table 400. The CPU 30 ends the above series of process steps and returns to the original process. Specifically, in step S604, the document number of the flow object is registered in the field 402, the front position calculated in step S600 is registered in the field 404, the ID attached to the text information storage frame is registered in the field 406, the current page number is registered in the field 408, and the finish flag is cleared. The record of the flow object is thus generated. The same is true of the process in step S606.

When it is determined that any record, having the same document number and the cleared finish flag, is present in the flow management table 400 (i.e., Yes) in step S602, the routine proceeds to step S606. A record of the flow object is generated, and the same process as that in step S514 is performed on the generated record. The generated record is registered at the top of the flow management table 400. The CPU 30 ends the above series of process steps and returns to the original process.

Figure 15:
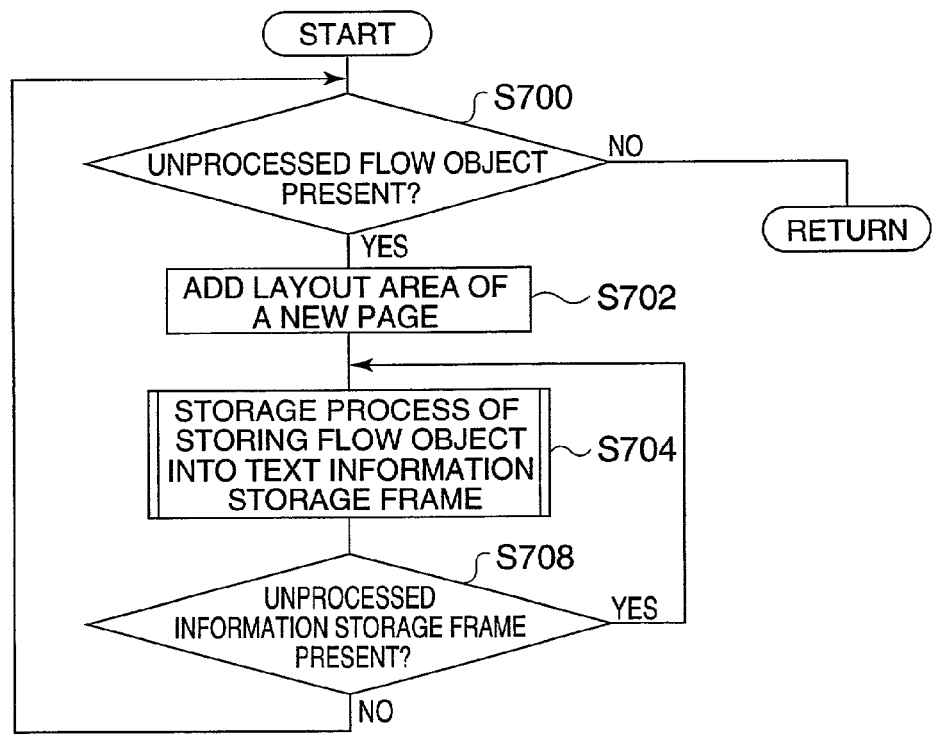
FIG. 15 is a flow diagram illustrating the process of an unprocessed flow object.

The process of the unprocessed flow object in step S322 is detailed below with reference to FIG. 15. FIG. 15 is a flow diagram showing the process of the unprocessed flow object.

Upon being activated in step S322, the process of the unprocessed flow object proceeds to step S700 as shown in FIG. 15.

In step S700, the CPU 30 starts with the top of the flow management table 400, sequentially searching for records having the finish flag thereof cleared. When it is determined that any record with the finish flag thereof cleared is present (i.e., Yes), the process proceeds to step S702, or else (i.e., No) the CPU 30 ends the above series of process steps and returns to the original process.

In step S702, the layout area 360 on a new page is added. Like in step S308, the shape and location of the text information storage frame for storing the flow object are determined, and the flow object is stored in the text information storage frame in step S704. In step Sigh, it is determined whether any unprocessed text information storage frame is present in the layout area 360. When it is determined in step Sigh that an unprocessed text information storage frame is present (i.e., Yes), the process proceeds to step S704, or else (i.e., No) the process proceeds to step S700.

The operation of the above embodiment is now discussed. The process of registering information required to deliver the digital content is discussed below.

When the user desires delivery of a digital content, the user accesses a content delivery terminal 100 at a user terminal 200 using a WWW browser, and then inputs a user registration request.

When the user terminal 200 receives the user registration request, the user terminal 200 requests the user to input required user information in communication with the content delivery terminal 100. In response to the request, the user inputs, as the user information, a main category, a sub-category, a user ID, a password, a destination address, the date of delivery, the time of delivery, a layout number, the maximum number of pages, and a font size. The user information is then sent to the content delivery terminal 100.

Upon receiving the user information in response to the registration request, the content delivery terminal 100 registers the received user information in the user profile table 300 after process steps S100–S114.

The process of delivering a digital content is discussed below referring to the user profile table 300.

When the content delivery terminal 100 determines that it is the day and time to deliver the digital content, by referencing the user profile table 300, the CPU 30 performs process steps in S204 and S206. The CPU 30 therefore reads the category number from the user profile table 300 and searches for digital contents in the content registration DB 42, based on the read category number, thereby retrieving a digital content having a category number identical to the read category number. Through process steps S208–S212, the CPU 30 reads a layout number from the user profile table 300, and references a layout number definition table 330, thereby reading a layout definition file corresponding to the read layout number from the user information registration DB 40. The CPU 30 determines an output layout for the retrieved digital content based on the read layout definition file, and produces a digital content.

In the layout process, the CPU 30 determines the location of a fixed line, the shape and location of fixed text information, and the shape and location of fixed image information through steps S300–S310 in that order. The CPU 30 selects a document to be arranged in the layout area 360 from the digital contents retrieved in step S206 in accordance with a predetermined priority order.

When the title information is contained in the selected document, the title information contained in the selected document is stored in the title information storage frame in step S312. Specifically, the amount of information of the title information contained in the selected document is calculated, the shape and location of the title information storage frame are determined based on the calculated amount of information, and the title information contained in the selected document is stored into the title information storage frame.

When image information is contained in the selected document, the image information contained in the selected document is stored into the image information storage frame in step S314. Specifically, the amount of image information included in the selected document is calculated, the shape and location of the image information storage frame are determined based on the calculated amount of information so that the image information storage frame does not overlap another information storage frame. The image information contained in the selected document is then stored into the image information storage frame.

When text information is contained in the selected document, the text information contained in the selected document is stored into the text information storage frame in step S316. Specifically, when an ID is attached to the text information storage frame, the amount of text information contained in the selected document is calculated, the shape and location of the text information storage frame are determined based on the calculated amount of text information so that the text information storage frame does not overlap another information storage frame, and the text information contained in the selected document is stored into the text information storage frame through steps S400–S406.

When the text information storage frame is not sufficient to store the text information with a portion thereof overflowed, the record of the flow object is registered at the end of the flow management table 400 through steps S408, S414, and S600–S604. When the text information storage frame has successfully stored the text information, the process ends with no record registered in the flow management table 400. If any unused text information storage frame having the same ID as that of the current text information storage frame is present, the ID attached to the text information storage frame is deleted through steps S410 and S412 to make the text information storage frame available for another use.

When no ID is attached to the text information storage frame, the amount of text information contained in the selected document is calculated, the shape and location of the text information storage frame are determined based on the calculated amount of text information so that the text information storage frame does not overlap another information storage frame, and the text information contained in the selected document is stored into the text information storage frame, through steps S400, and S416–S420. When the text information storage frame is not sufficient to store the text information with a portion thereof overflowed, the flow object is discarded by column, by sentence, or by word in step S424 because no destination is present for the flow object. When the text information is successfully stored into the text information storage frame, the CPU 30 ends the process.

The storage process to the title information storage frame, the storage process to the image information storage frame, and the storage process to the text information storage frame are repeated until no unprocessed information storage frames are present in the layout area 360. The document is thus arranged within the layout area 360 on a single page.

When no unprocessed information storage frames are present within the layout area 360, the layout area 360 on a next page in the layout definition file read in step S210 is set as an object to be processed in step S324. The storage process is performed on the text information storage frame in the layout area 360 on that page. In the same way as described above, the storage process to the title information storage frame, the storage process to the image information storage frame, and the storage process to the text information storage frame are performed until no unprocessed information storage frames are present in the layout area 360.

In the storage process of the flow object, the flow object, if present, is stored into the text information storage frame in step S308. Specifically, when an ID is attached to a text information storage frame, the CPU 30 starts with the top of the flow management table 400, searching for a record having a cleared finish flag and the same ID as that of the current text information storage frame through steps S500–S510. If such a record is present, the flow object is read by referencing that record. The amount of information of the read flow object is calculated. The shape and location of the text information storage frame are determined based on the calculated amount of the information of the flow object so that the text information storage frame does not overlap another information storage frame. The text information contained in the selected document is stored into the text information storage frame. If the flow object is not successfully stored in the text information storage frame with a portion thereof overflowed, a record of the flow object is registered on the top of the flow management table 400 through steps S512, S520, S600, S602, and S606. If the text information storage frame has successfully stored the flow object, the record is updated in step S514, and the process step ends. If an unused text information storage frame having the same ID as that of the current text information storage frame is present, the ID attached to the text information storage frame is deleted to make the text information storage frame available for another use in steps S516 and S518.

When the text information storage frame having the ID is not sufficient to store the text information with a portion thereof overflowed, that flow object is then stored into a text information storage frame having the same ID as that of the text information storage frame.

The storage process of the flow object to the title information storage frame, to the image information storage frame, and to the text information storage frame are repeated on all pages in the layout definition file read in step S210. The document is thus arranged in the layout areas 360 on all pages, and the output layout of the digital content is thus determined.

When the output layout of the digital content is determined, the delivery destination address is read from the user profile table 300 in steps S212 and S214. The produced digital content is then sent to the read delivery destination address.

When any unprocessed flow object is present after the layout areas 360 on all pages in the layout definition file read in step S210 are processed, process in steps S702–Sigh are repeated until no unprocessed flow objects are present. A layout area 360 on a new page is added, a text information storage frame for storing a flow object is arranged in the new layout area 360, the shape and location of the text information storage frame are determined based on the amount of information of the flow object, and the flow object is then stored into the text information storage frame.

In accordance with this embodiment, when the text information storage frame is not sufficient to store the text information, the content delivery terminal 100 stores the flow object into another text information storage frame having the same ID as that of the text information storage frame.

When the text information is too large in size to be stored into the text information storage frame, the flow object is stored into another text information storage frame in this way. This arrangement eliminates the need to change the form of the text information such as the font size thereof and reduces the probability that the shape, etc. of the text information storage frame is affected by the size of the text information. Particularly, since the flow object is stored into the text information storage frame associated with the text information storage frame, the order of posting information is not destroyed even if the flow object occurs. The layout consistency is not so destroyed by the content of, the amount of, and the logical structure of the text information as in the conventional art. The probability that the layout intended by a designer is destroyed is reduced. The order of posting information is fairly prevented from being disturbed by the occurrence of the flow object.

In this embodiment, the content delivery terminal 100 stores the text information or the flow object thereof into the plurality of associated information storage frames in order of increasing page number of the layout areas to which the text information storage frames are assigned.

Since the content of the text information is posted in the order of from small to large page number, the digital content is provided in an easy-to-see output layout.

The content delivery terminal 100 stores the end of the flow object into the text information storage frame in this embodiment. If an unused text information storage frame having the same ID as that of the text information storage frame is present, the ID attached to that unused text information storage frame is deleted.

If an unused text information storage frame having the same ID as that of the text information storage frame is present when the end of the flow object is stored into the text information storage frame, the unused text information storage frame is available for other use. The text information storage frame is relatively effectively used.

An unprocessed flow object may be present when the document is arranged in all layout areas 360 defined by the layout definition file. In such a case, the content delivery terminal 100 in this embodiment adds the new layout area 360, arranges the text information storage frame in the newly added layout area 360, and stores the unprocessed flow object into the arranged text information storage frame. This arrangement reduces the number of missing digital contents to be posted.

In this embodiment, the content delivery terminal 100 repeats the addition of a new layout area 360, the arrangement of a flow object, and the storage of the flow object until no unprocessed flow objects are present. In this way, this arrangement further reduces the number of missing digital contents to be posted.

When the text information storage frame containing the flow object overlaps another information storage frame, the content delivery terminal 100 in this embodiment determines the shape and location of the other information storage frame so that the text information storage frame containing the flow object does not overlap the other information storage frame.

The arrangement of the flow object is performed with higher priority than that with which information is arranged in the other information storage frame.

The content delivery terminal 100 in this embodiment searches for and retrieves the digital content in the content registration DB 42 based on the user information in the user information registration DB 40.

Since unique information about a user and information designated by a user are referenced in the selection of the digital content, the digital content relatively satisfying to the user is thus produced.

The content delivery terminal 100 in this embodiment determines the output layout of the digital content based on the user information in the user information registration DB 40, before producing the digital content.

Since unique information about the user and information designated by a user are referenced in the determination of the output layout, the digital content relatively satisfying to the user is thus produced.

The content delivery terminal 100 in this embodiment determines the shapes of the title information storage frame, the image information storage frame, and the text information storage frame so that the title information storage frame, the image information storage frame, and the text information storage frame are sized to the smallest possible shapes that still allow themselves to respectively store the title information, the image information, and the text information.

In this way, the title information storage frame, the image information storage frame, and the text information storage frame respectively store the title information, the image information, and the text information.

The content delivery terminal 100 in this embodiment determines the shapes and locations of the title information storage frame, the image information storage frame, and the text information storage frame in that order.

Since the layout is determined in the order of arrangement that accounts for the importance of layout, the digital content is produced in an output layout easy to see.

When the text information storage frame is not sufficient to store the text information, the content delivery terminal 100 in this embodiment stores the document number and the overflow position of the flow object into the flow management table 400. When the flow object is stored into the text information storage frame, the document number and the overflow position are read from the flow management table 400. The flow object is then stored into the text information storage frame based on the read document number and the overflow position.

Since the flow object is relatively regularly arranged, the digital content is produced in an output layout easier to see.

The content delivery terminal 100 in this embodiment performs a registration operation from the end of the flow management table 400, and performs a reading operation from the top of the flow management table 400.

Since the flow object is fairly regularly arranged, the digital content is produced in an output layout even easier to see.

As for the same text information, the content delivery terminal 100 in this embodiment performs a registration operation of a flow object from the top of the flow management table 400 at the second or more time of the registration.

Since the flow object that is registered for the second or more time for the same text information is arranged with priority, the content of the text information is prevented from straddling across a number of pages to some degree.

The content delivery terminal 100 in this embodiment sets a finish flag when the end of the flow object has been stored into the flow object storage frame. When the flow object is being stored in the flow object storage frame, the content delivery terminal 100 reads, from the flow management table 400, the document number and the overflow position of a record with the finish flag thereof cleared.

In this way, the process of the flow object using the flow management table 400 becomes relatively easy.

When the text information storage frame is not sufficient to store the text information, the content delivery terminal 100 in this embodiment stores the flow object into a text information storage frame having the same ID as that of the text information storage frame. There are times when one text information storage frame and another text information storage frame, from among a plurality of associated text information storage frames, are distributed straddling across pages. The text information or the flow object is stored into the one text information storage frame and the other text information storage frame. A blank page with a layout area 360 having neither text information nor flow object arranged therewithin may be included between the page bearing the one text information storage frame and the other page bearing the other text information storage frame. No solution to the blank page has been described in the discussion of the above-referenced embodiment. In this case, for example, the layout area 360 on the blank page may be deleted.

Since the text information is stored into the text information storage frame in accordance with the association, the probability that a blank page is generated between the pages bearing the information is reduced. The digital content is produced in an output layout easier to see.

When the text information storage frame storing the flow object overlaps another information storage frame, the content delivery terminal 100 in this embodiment determines the shape and location of the other information storage frame so that the text information storage frame does not overlap the other information frame. Alternatively, the content delivery terminal 100 determines the shape and location of the text information storage frame storing the flow object so that the text information storage frame storing the flow object does not overlap the other information storage frame, when the text information storage frame storing the flow object overlaps the other information storage frame. Specifically, the same process as that in step S404 may be performed in step S508.

The arrangement of information into another information storage frame is prioritized over the arrangement of the flow object.

Figure 16:
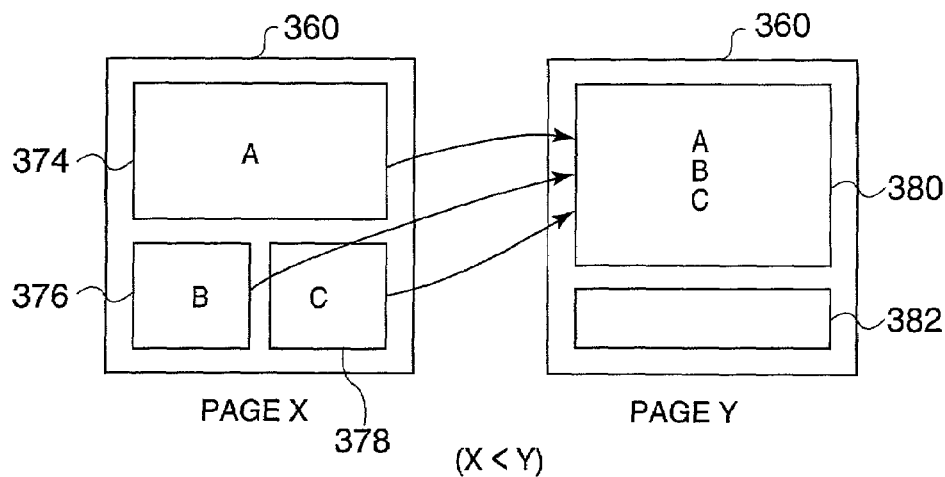
FIG. 16 illustrates a portion of the data structure of the layout definition file.

The content delivery terminal 100 in this embodiment attaches a single ID to one text information storage frame. It should be understood that the present information is not limited to this arrangement. A plurality of IDs may be attached to one text information storage frame as shown in FIG. 16. FIG. 16 shows the data structure of a layout definition file.

Referring to FIG. 16, the layout area 360 on page X includes text information storage frames 374, 376, and 378. IDs "A," "B," and "C" are respectively attached to the text information storage frames 374, 376, and 378.

A layout area 360 on page Y (X<Y) includes a text information storage frame 380, and the other text information storage frame 382. The ID "A," "B," and "C" are attached to the text information storage frame 380 in that order.

Figure 17:
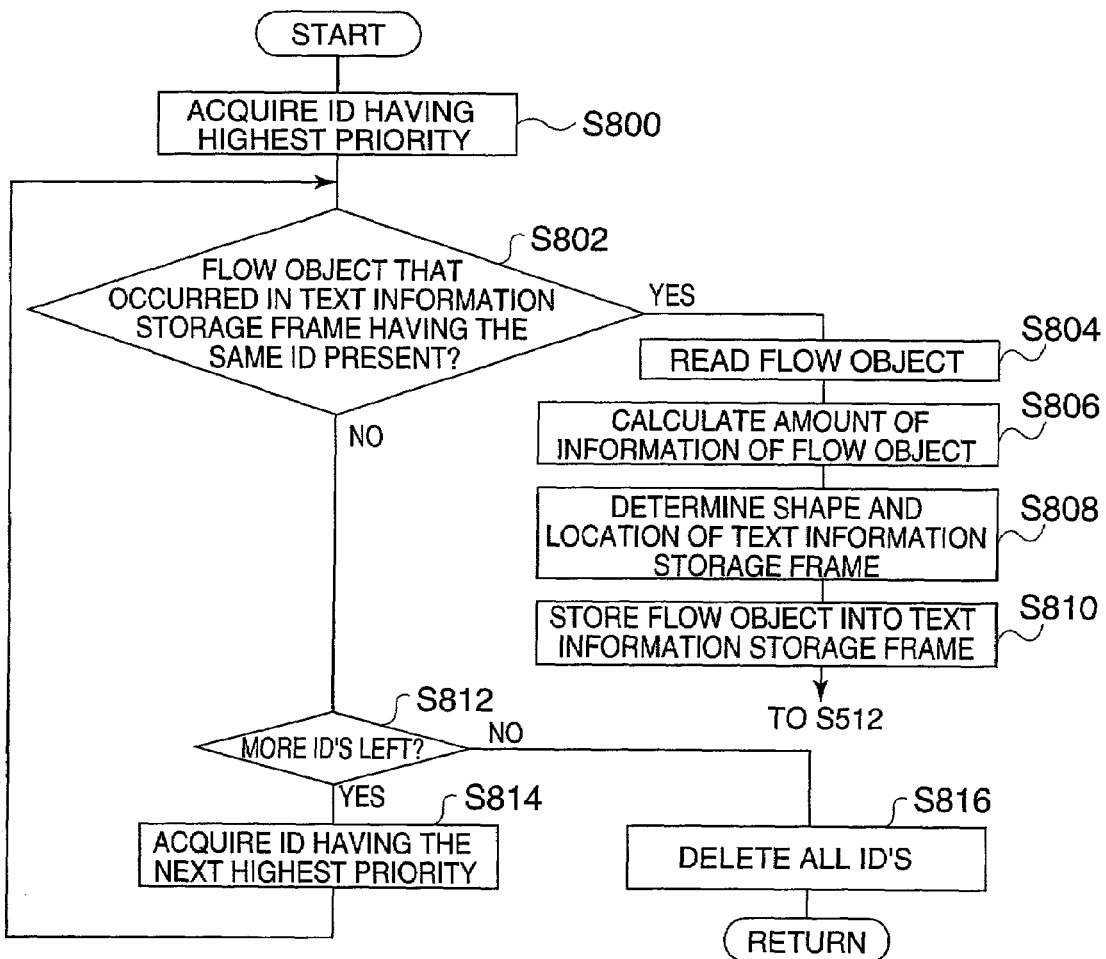
FIG. 17 is a flow diagram illustrating the storage process of a flow object wherein a plurality of IDs are used.

The storage process of the flow object may be executed in a flow diagram shown in FIG. 17. FIG. 17 is the flow diagram of the storage process of the flow object with a plurality of IDs attached to the same text information storage frame.

The storage process of the flow object corresponds to steps S502–S510. The CPU 30 executes the storage process, starting with step S800 as shown in FIG. 17.

In step S800, the CPU 30 acquires an ID having the highest priority (for example, the first one in attaching order of the IDs to a text information storage frame), from among IDs attached to the text information storage frames. In step S802, the CPU 30 starts with the top of the flow management table 400, searching for a record with the finish flag thereof cleared and having the same ID as that of the acquired ID. When it is determined that a record with the finish flag thereof cleared and having the same ID as that of the acquired ID is present in the flow management table 400 (i.e., Yes), the process proceeds to step S804.

In step S804, the CPU 30 references that record, thereby reading a flow object. In step S806, the CPU 30 calculates the amount of information of the read flow object. In step S808, the CPU 30 determines the shape and location of the text information storage frame based on the calculated amount of information. In step S810, the CPU 30 stores the read flow object into the text information storage frame, and then proceeds to step S512.

When it is determined in step S802 that any record with the finish flag thereof cleared and having the same ID as that of the acquired ID is not present (i.e., No), the process proceeds to step S812. The CPU 30 determines whether any ID attached to the text information storage frame and not to be determined in step S802 remains. When it is determined an ID not to be determined remains (i.e., Yes), the process proceeds to step S814. The CPU 30 then acquires the next highest priority ID (for example, a second one in attaching order of the IDs to a text information storage frame), from among IDs attached to the text information storage frames. The process proceeds to step S802.

When it is determined in step S812 that no ID attached to the text information storage frame and not to be determined in step S802 remains (i.e., No), the process proceeds to step S816. The CPU 30 deletes all IDs attached to the text information storage frames, ends the above process steps, and returns to the original process.

Since the flow objects to be stored into the text information storage frames are prioritized in this way, the order of posting information is easy to regulate, and the text information storage frames are relatively effectively used.

In the above-referenced embodiment, the ID has no particular meaning. However, the ID may be given a category of the digital content as shown in FIG. 18 and may serve as a keyword. FIG. 18 shows a portion of the data structure of the layout definition file.

In accordance with a designated layout shown in FIG. 18(*a*), sports-related documents may be arranged in the text information storage frames tagged with IDs "A," and "B" on page X. In accordance with a designated layout shown in FIG. 18(*b*), sports-related documents may be arranged in the text information storage frames tagged with IDs "A," "B," and "C" on page X, and overflowed portions of sports-related documents may be laid out on page Y. By designating the layout on a page-by-page basis in this way, the documents are categorized page by page.

In the above-referenced embodiment, the content delivery terminal 100 stores a portion of the text information, which cannot be accommodated in the text information storage frame, into a text information storage frame having the same ID as that of the text information storage frame. The present invention is not limited to this arrangement. The text information storage frame having the same ID may begin with the head portion of the text information, thereby storing the full text information. The layout definition file or the user information may determine which of the two methods to adopt.

In the above-referenced embodiment, the content delivery terminal 100 discards the flow object if the text information storage frame has no ID and is not sufficient to fully store the text information with a portion thereof overflowed. The present invention is not limited to this arrangement. The content delivery terminal 100 adds a new layout area 360, arranges a text information storage frame in the newly added layout area 360, and stores the flow object into the arranged text information storage frame.

In the above-referenced embodiment, the content delivery terminal 100 discards the flow object if the text information storage frame has no ID and is not sufficient to fully store the text information with a portion thereof overflowed. The present invention is not limited to this arrangement. The content delivery terminal 100 produces a new text information storage frame on a page subsequent to the page having the text information storage frame that is not sufficient to fully store the text information, and stores the flow object into the newly produced text information storage frame. Alternatively, the content delivery terminal 100 stores the flow object into a text information storage frame that has already been arranged on the subsequent page.

In the above-referenced embodiment, the flow object is the text information. Alternatively, the flow object may be the title information or the image information. Since it is not preferred that the title information and the image information are overflowed respectively from the title information storage frame and the image information storage frame, it is occasionally better not to perform the flow process, which is performed in the text information, from the standpoint of layout.

In the above-referenced embodiment, no indication of an overflow is displayed in an information storage frame when the frame is unable to fully store an object with a portion of the object overflowed therefrom in the layout process. The present invention is not limited to this arrangement. Guide information serving as a reference for the flow object ("Continued To Page 3" when the flow object storage frame is on page 3, for example) may be stored in the information storage frame where the overflow takes place. Furthermore, link information indicating a link to the flow object storage frame storing the flow object may be stored together with the guide information. Upon clicking the guide information with a mouse, etc., the user, who has received the digital content, references the flow object by jumping to the location where the flow object is, placed, in accordance with the link information.

In the above-referenced embodiment, no indication of an overflow is displayed in a flow object storage frame which stores a flow object when an information storage frame is unable to fully store an object with the portion of the object overflowed therefrom. However, it should be understood that the present invention is not limited to this arrangement. Guide information serving as a reference for the object of the information storage frame from which the overflow takes place ("Continued From Page 1" when the information storage frame from which the overflow takes place is on page 1, for example) may be stored in the flow object storage frame that stores the flow object. Furthermore, link information indicating a link to the information storage frame from which the overflow takes place may be stored together with the guide information. Upon clicking the guide information with a mouse, etc., the user, who has received the digital content, references the object by jumping to the location of the object of the information storage frame from which the overflow takes place, in accordance with the link information.

In the above-reference embodiment, the shapes and locations of the information storage frames are determined in the order of the title information storage frame, the image information storage frame, and the text information storage frame. However, it should be understood that the present invention is not limited to this arrangement. The shapes and locations of the information storage frames are determined in any order. The determination order of the shapes and locations may be registered as the user information in the user profile table 300.

In the above-referenced embodiment, the shapes and locations of the information storage frames are dynamically determined during the layout process. It should be understood that the present invention is not limited to this arrangement. After information is stored in all information storage frames in the layout area 360, the shapes and locations of the information storage frames are then determined for layout.

The output layout of the digital content is determined based on the user information in the above-referenced embodiment. It should be understood that the present invention is not limited to this arrangement. The output layout of the digital content may be determined depending on the number of images contained in the digital content or depending on the amount of text information contained in the digital content.

In this way, the output layout becomes relatively easy to see even if the number of images or the amount of text information contained in the digital content is large, or even if the number of images or the amount of text information contained in the digital content is small.

The layout process in step S212 is performed in the content delivery terminal 100 in the above-referenced embodiment. It should be understood that the present invention is not limited to this arrangement. The layout process may be carried out in the user terminal 200. In this arrangement, the workload imposed on the content delivery terminal 100 is lightened.

In the above-referenced embodiment, the processes shown in the flow diagrams in FIG. 9 through FIG. 15 and FIG. 17 are performed by executing a control program stored beforehand in the ROM 32. It should be understood that the present invention is not limited to this. Before being executed, the control program for these process steps may be read from a storage medium into the RAM 34.

The storage medium may be a semiconductor storage medium such as an RAM, an ROM, etc, a magnetic storage medium such as an FD, an HD, etc, an optical storage medium such as a CD, a CDV, an LD, a DVD, etc., or a magnetooptical storage medium such as an MO, etc. The storage medium is thus any computer readable storage medium that permits data to be read electronically, magnetically, or optically.

In the above embodiment, the digital content production system and the digital content production program of the present invention are implemented in a network system including the Internet 199. It should be understood that the present invention is not limited to this arrangement. Alternatively, the present invention may be applied to a so-called intranet that performs communication by the same method as that of the Internet 199. The present invention is not limited to a network that performs communication by the same method as that of the Internet 199, and may be applied to an ordinary network.

In the digital content production system and the digital content production program of the above embodiment of the present invention, the content delivery terminal 100 delivers digital contents such as news to the user terminal 200 as shown in FIG. 1. The present invention is not limited to this arrangement, and may be applied to other system configuration without departing from the scope and spirit of the present invention.

ADVANTAGES

As described above, in accordance with the digital content production system of the present invention, the overflowed information to be posted is stored into another information storage frame when the information to be posted is too large to be stored in an information storage frame. This arrangement eliminates the need for changing the form such as a font, etc., and reduces the probability that the shapes, etc., of the information storage frames are affected by the quantity of the information to be posted. Since the overflowed information to be posted is stored into the other information storage frame associated with the information storage frame, the probability that the order of positing the information to be posted is destroyed is small even if the overflowed information to be posted is generated. In comparison with the conventional art, the present invention reduces the probability that the layout consistency is lost and the layout intended by a designer is destroyed by the content of, the amount of, and the logical structure of the information to be posted. The posting order of information is prevented from being disturbed by the overflow of the information to be posted to some degree.

In accordance with the digital content production system of the present invention, the content of the information to be posted is posted in the order of from small to large page number, and the digital content for output is thus produced in an output layout relatively easy to see.

In accordance with the digital content production system of the present invention, the flow destination information storage frame or the position where the flow destination information storage frame is arranged may be available for another use when the information storage frame storing the end of the overflowed information is associated with the flow destination information storage frame. The information storage frame is thus effectively used.

In accordance with the digital content production system of the present invention, the number of the missing digital contents for arrangement to be posted is reduced.

In accordance with the digital content production system of the present invention, the digital content for output is produced in a layout easy to see when the digital content for output has a large number of pages.

In accordance with the digital content production system of the present invention, the probability that a blank page is generated between the pages bearing the information is reduced when the information to be posted is stored into the information storage frames in accordance with the association. The digital content for output is thus produced in an output layout relatively easy to see.

In accordance with the digital content production system of the present invention, the arrangement of the overflowed information is prioritized over the arrangement of information into another information storage frame.

In accordance with the digital content production system of the present invention, the arrangement of information into another information storage frame is prioritized over the arrangement of the overflowed information.

In accordance with the digital content production system of the present invention, the overflowed information to be stored into the flow destination information storage frame has a priority, and thus the order of posting information is easy to regulate, and the information storage frames are relatively effectively used.

In accordance with the digital content production system of the present invention, the information storage frame for storing overflowed information to be posted stores the overflowed information to be posted that is overflowed from another information storage frame with identification information having meaning identical to or similar to that of identification information of the information storage frame. As a result, the order of posting information is defined by the meaning of the information.

In accordance with the digital content production system of the present invention, unique information about the user and information designated by the user are referenced in the selection of the digital contents for arrangement, and thereby the digital content for output relatively satisfying to the user is thus produced.

In accordance with the digital content production system of the present invention, unique information about the user and information designated by the user are referenced in the determination of the output layout, the digital content for output relatively satisfying to the user is thus produced.

The digital content production program provides the same advantages as those of the digital content production system.

While this invention has been described in conjunction with the specific embodiment thereof, it is evident that many alternatives, modifications and variations will be apparent to those skilled in the art. Accordingly, preferred embodiments of the invention as set forth herein are intended to be illustrative not limiting. There are changes that may be made without departing from the spirit and scope of the invention.

What is claimed is:

1. A digital content production system, comprising:
   a content storage device that stores registered digital contents;
   a content selection device that selects digital contents for arrangement in the content storage device; and
   a content production device that produces a digital content for output to be displayed to a user by determining an output layout of the digital contents for arrangement selected by the content selection device,
   the content production device producing the digital content for output by arranging information to be posted forming the digital contents for arrangement into a predetermined frame in a layout area, and
   the content production device producing the digital content for output by storing the information to be posted in a plurality of information storage frames, each information storage frame associated with a page and arranged in the layout area on the page to contain the information to be posted, and
   wherein the information storage frame of the page is not sufficient to store the information to be posted, overflowed information to be posted that cannot be stored in the information storage frame of the page is stored into another information storage frame associated with another non-continuous page,
   wherein said digital content production system, further comprises:
   a layout definition information storage device that stores layout definition information that defines a state in which the plurality of information storage frames are associated with each other and arranged in the layout area,
   the content production device storing information to be posted into the plurality of information storage frames by referencing the layout definition information in the layout definition information storage device, thereby producing the digital content for output containing a plurality of layout areas on a one layout area per page basis, and
   the overflowed information to be posted being stored into the another information storage frame associated with the information storage frames when the information storage frames are not sufficient to fully store the information to be posted.

2. The digital content production system according to claim 1, the digital content production device storing at least one of the information to be posted and the overflowed information to be posted into the plurality of associated information storage frames in order of an increasing page number of the layout areas to which the information storage frames are assigned.

3. The digital content production system according to claim 1, wherein when the information storage frame that stores the end of the overflowed information to be posted is associated with a flow destination information storage frame for storing the overflowed information to be posted, the content production device disengages the association between the two information storage frames.

4. The digital content production system according to claim 1, wherein when the information storage frame which is not sufficient to store at least one of the information to be posted and the overflowed information to be posted is not associated with a flow destination information storage frame for storing the overflowed information to be posted, the content production device discards pieces of at least one of the information to be posted and of the overflowed information to be posted that are not fully stored in the information storage frame.

5. The digital content production system according to claim 1, wherein when the information storage frame which is not sufficient to store at least one of the information to be posted and the overflowed information to be posted is not associated with a flow destination information storage frame for storing the overflowed information to be posted, the content production device arranges a new flow destination information storage frame in a layout area on a next page, and stores at least one of pieces of the information to be posted and of the overflowed information to be posted that are not fully stored in the information storage frame, into the new flow destination information storage frame.

6. The digital content production system according to claim 1, wherein when one information storage frame and another information storage frame, among the plurality of associated information storage frames, are arranged straddling across pages, the one information storage frame and the other information storage frame store at least one of the information to be posted and the overflowed information to be posted, and when a blank page having any layout area containing neither information to be posted nor overflowed information to be posted is present between the pages which have respectively the one information storage frame and the other information storage frame, the content production device deletes a layout area of the blank page.

7. The digital content production system according to claim 1,
wherein the information storage frames are associated with each other by attaching identification information to each information storage frame, and
wherein when the information storage frame with the identification information attached thereto is not sufficient to fully store the information to be posted, the content production device stores the overflowed information to be posted into an information storage frame having identification information corresponding to the identification information of the information storage frame.

8. The digital content production system according to claim 7, a plurality of different pieces of identification information being attached to one information storage frame.

9. The digital content production system according to claim 8, the plurality of different pieces of identification information being attached to a flow destination information storage frame for storing the overflowed information to be posted, and
wherein when a plurality of pieces of overflowed information are generated from the information storage frames having the identification information corresponding to the identification information of the flow destination information frame, the content production device selects from among the plurality of pieces of identification information of the flow destination information storage frame the identification information which corresponds to the identification information of the information storage frame with the information to be posted overflowed therefrom, and which corresponds to a predetermined turn in attaching order of the identification information with respect to the flow destination information storage frame, and then stores, into the flow destination information frame, the information to be posted overflowed from the information storage frame having the identification information corresponding to the selected identification information.

10. The digital content production system according to claim 7, the identification information functioning as a keyword, and
wherein when the information storage frame having the identification information is not sufficient to store the information to be posted, the content production device stores the overflowed information to be posted into another information storage frame with identification information having a meaning as that of the identification information of the information storage frame.

* * * * *